United States Patent
Lee et al.

(10) Patent No.: US 9,554,084 B2
(45) Date of Patent: *Jan. 24, 2017

(54) DISPLAY DEVICE AND CONTROLLING METHOD THEREOF

(71) Applicant: LG Electronics Inc., Seoul (KR)

(72) Inventors: Hyeseung Lee, Seoul (KR); Sanghyun Baek, Seoul (KR); Hyeongjin Park, Seoul (KR); Jeean Chang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,091

(22) Filed: Oct. 2, 2015

(65) Prior Publication Data

US 2016/0269677 A1 Sep. 15, 2016

(30) Foreign Application Priority Data

Mar. 11, 2015 (KR) .......................... 10-2015-0033736
Apr. 3, 2015 (KR) .......................... 10-2015-0047263

(51) Int. Cl.
*H04N 5/44* (2011.01)
*H04N 7/01* (2006.01)
(Continued)

(52) U.S. Cl.
CPC .......... *H04N 7/0122* (2013.01); *H04N 5/4403* (2013.01); *H04N 5/44582* (2013.01); *H04N 5/44591* (2013.01); *H04N 5/45* (2013.01); *H04N 21/42204* (2013.01); *H04N 21/4728* (2013.01); *H04N 2005/443* (2013.01); *H04N 2005/4412* (2013.01)

(58) Field of Classification Search
CPC ...... H04N 7/0122; H04N 5/4403; H04N 5/45; H04N 5/44582; H04N 2005/443; H04N 2005/4412; G06F 2203/04805
USPC ........................................................ 348/561
See application file for complete search history.

(56) References Cited

U.S. PATENT DOCUMENTS

2007/0033544 A1 2/2007 Fleisher et al.
2007/0200953 A1* 8/2007 Liu .................... H04N 21/4728
348/561
(Continued)

FOREIGN PATENT DOCUMENTS

KR 10-2007-0022892 A 2/2007
KR 10-0817315 B1 3/2008
(Continued)

*Primary Examiner* — Michael Lee
*Assistant Examiner* — Humam Satti
(74) *Attorney, Agent, or Firm* — Birch, Stewart, Kolasch & Birch, LLP

(57) ABSTRACT

A display device including a display module configured to display a content corresponding to a video on a main screen of the display device; an interface module configured to receive an enlargement input request from a remote controller; and a controller configured to enter an enlargement mode in accordance with the enlargement input request received from the remote controller, display a window including the content displayed on the main screen, display an indicator for selecting a specific area of the displayed content within the displayed window, enlarge the selected specific area of the displayed content, and display the enlarged selected specific area of the displayed content on the main screen.

44 Claims, 30 Drawing Sheets

(51) Int. Cl.
    *H04N 5/45*         (2011.01)
    *H04N 5/445*       (2011.01)
    *H04N 21/422*     (2011.01)
    *H04N 21/4728*   (2011.01)

(56) References Cited

U.S. PATENT DOCUMENTS

| | | | |
|---|---|---|---|
| 2008/0074550 A1 | 3/2008 | Park | |
| 2008/0079754 A1* | 4/2008 | Kuroki | H04N 5/45 345/660 |
| 2010/0188579 A1* | 7/2010 | Friedman | H04N 5/45 348/565 |
| 2010/0231791 A1* | 9/2010 | Prestenback | H04N 5/44591 348/565 |
| 2010/0253619 A1* | 10/2010 | Ahn | G06F 3/012 345/157 |
| 2011/0285764 A1* | 11/2011 | Kimura | G09G 3/3426 345/697 |
| 2015/0124147 A1* | 5/2015 | Lee | G06T 3/0025 348/333.11 |

FOREIGN PATENT DOCUMENTS

| | | |
|---|---|---|
| KR | 10-2008-0040696 A | 5/2008 |
| KR | 10-2013-0041052 A | 4/2013 |
| KR | 10-2014-0002911 A | 1/2014 |

\* cited by examiner

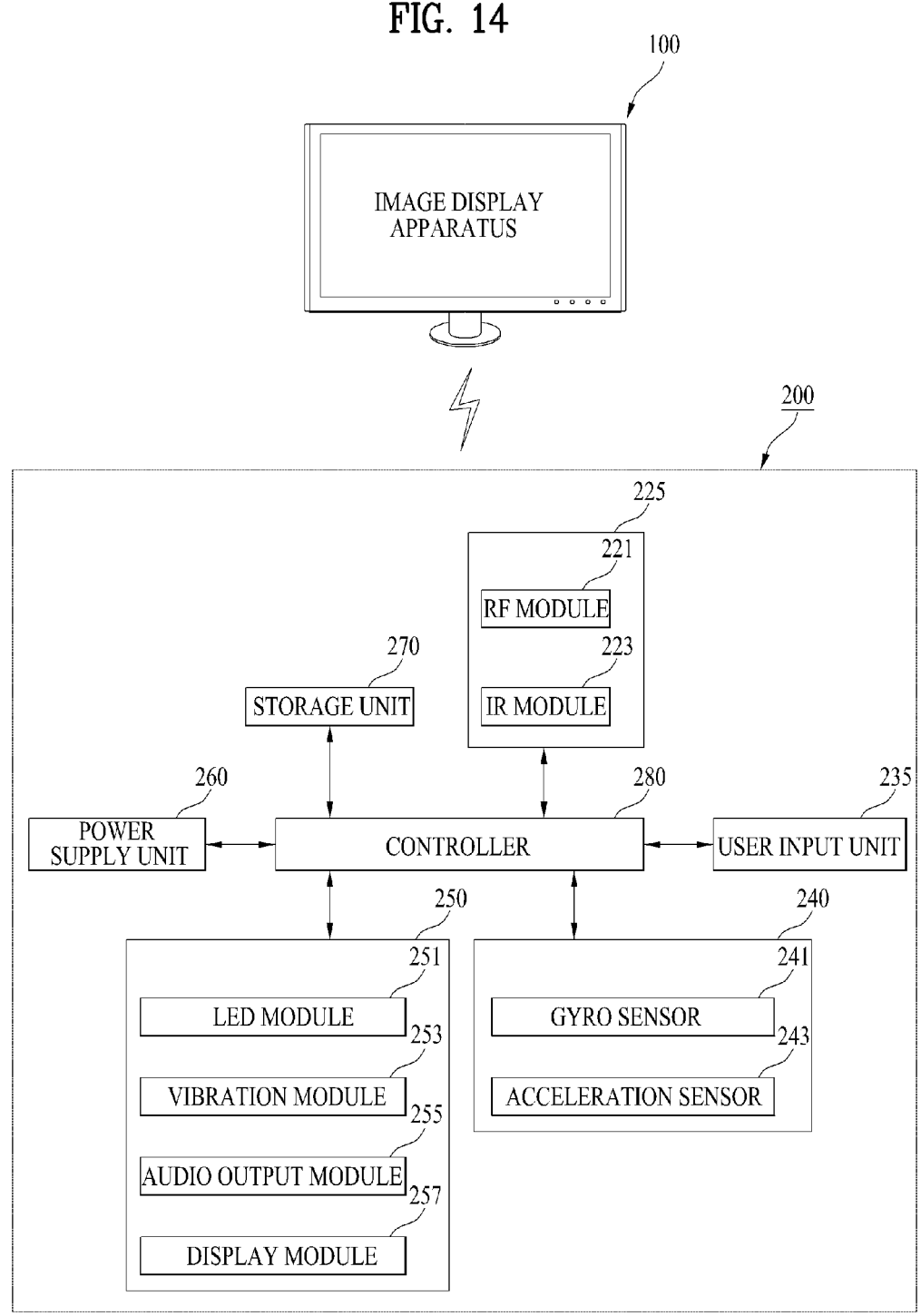

FIG. 21
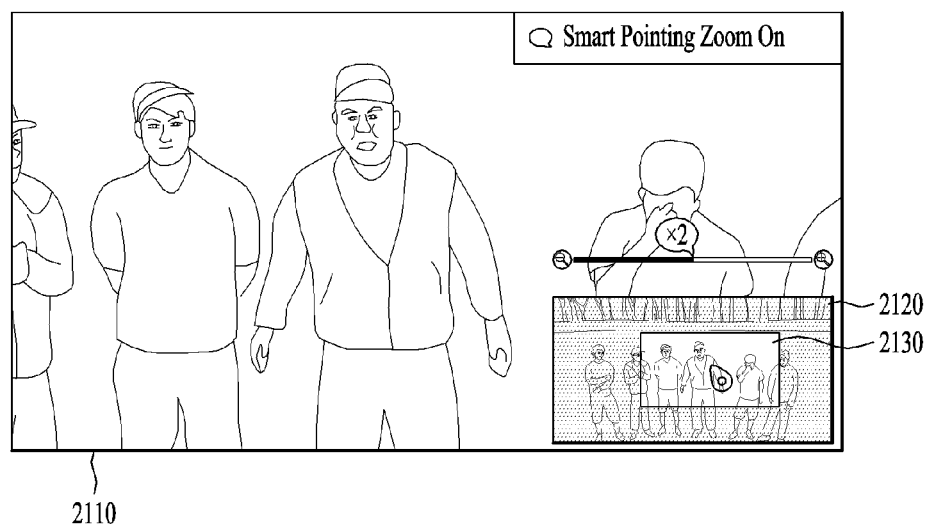
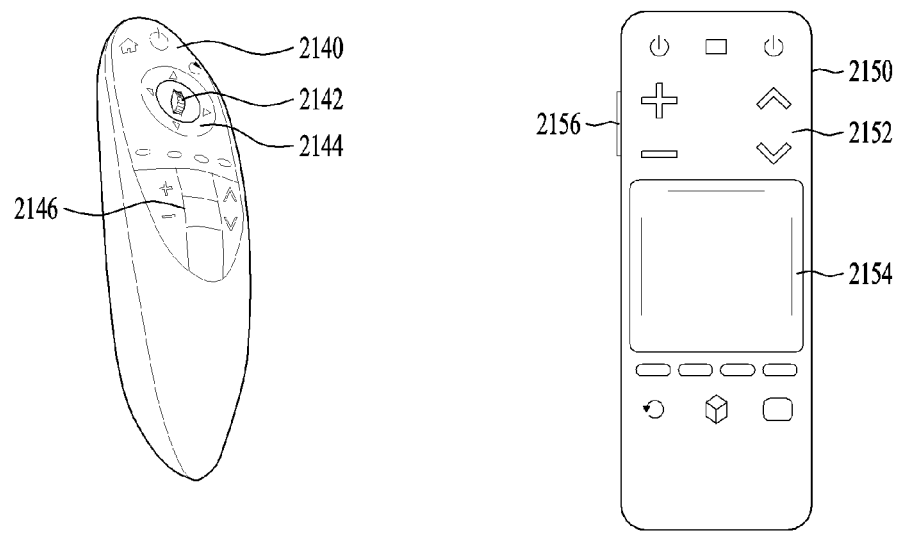

Final, Main: Zoom screen, PIP: Full screen, Zoom screen, Final, Full screen

FIG. 27
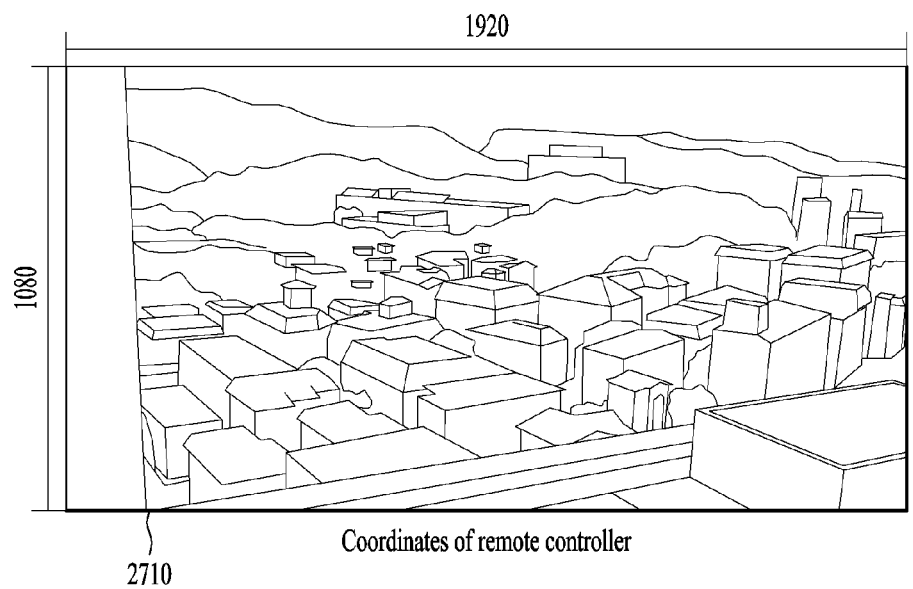
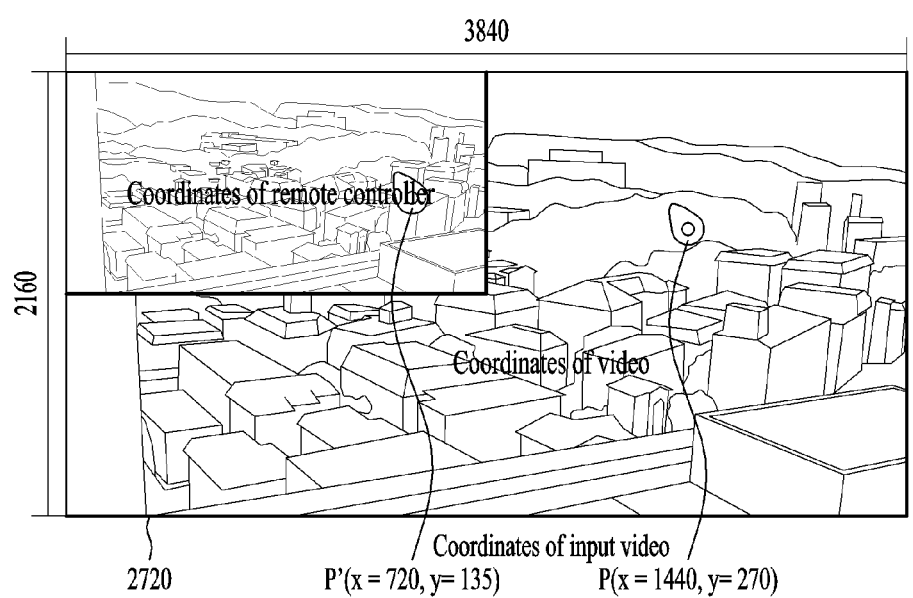

FIG. 28
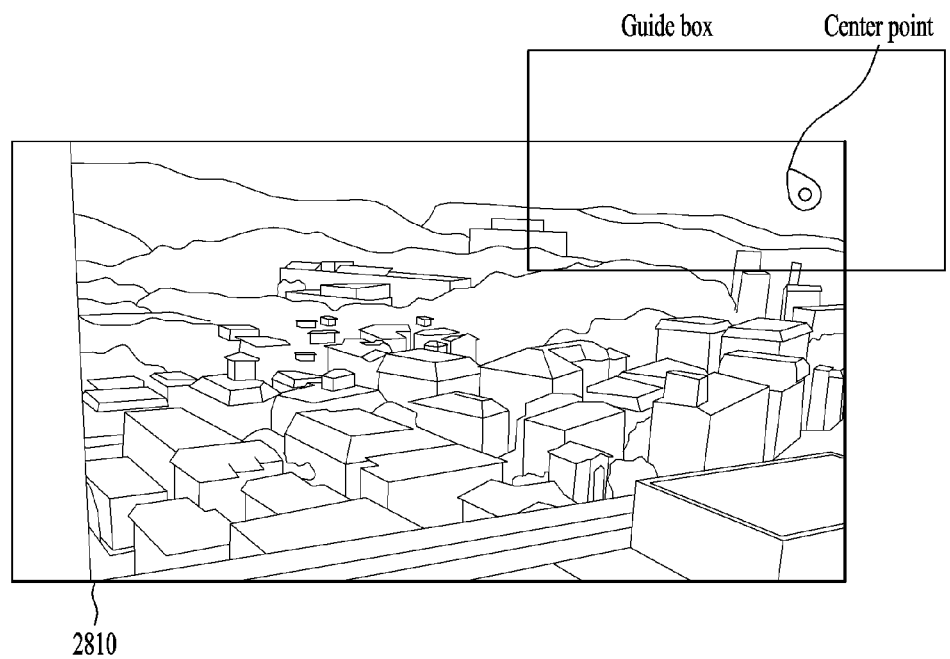
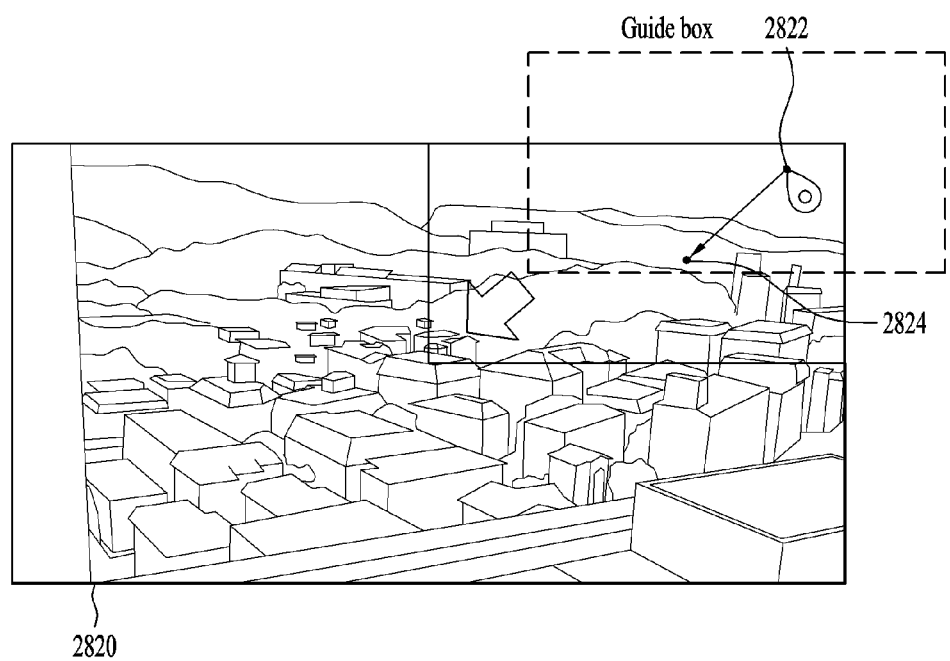

FIG. 29
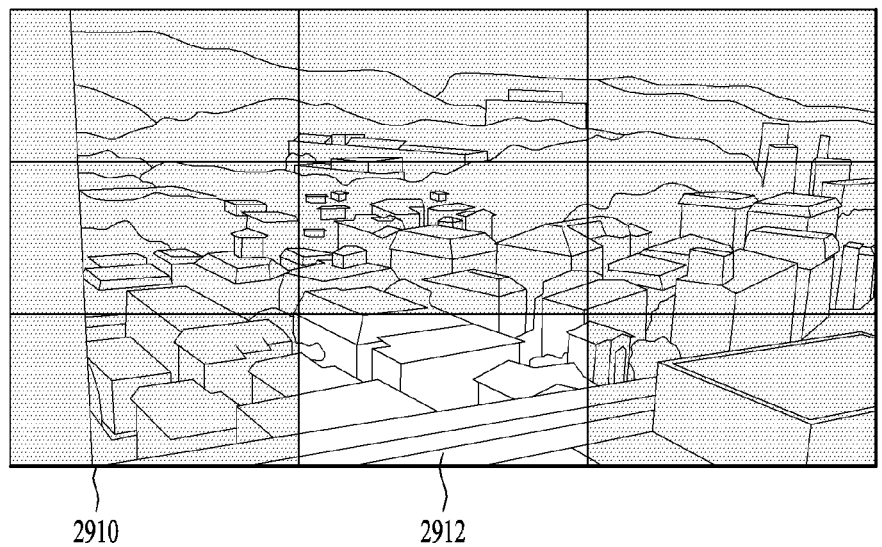
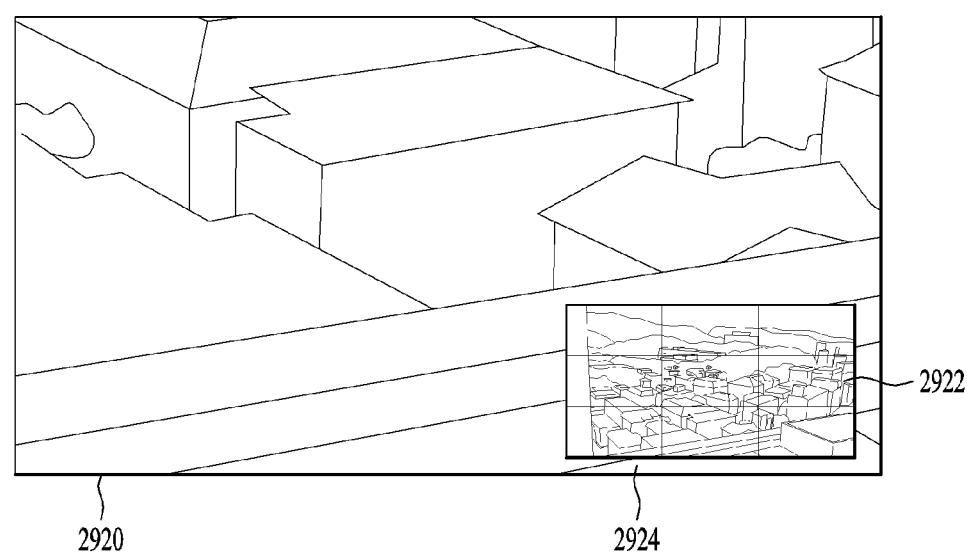

FIG. 31
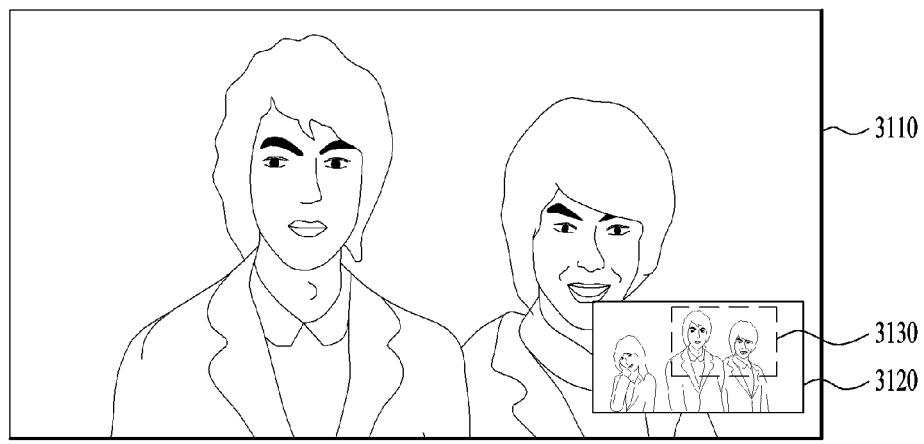
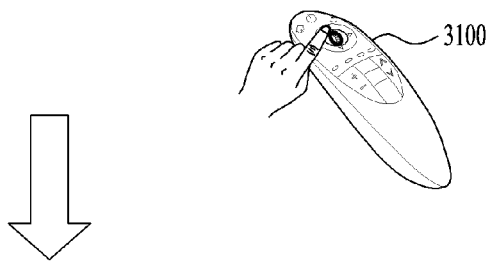
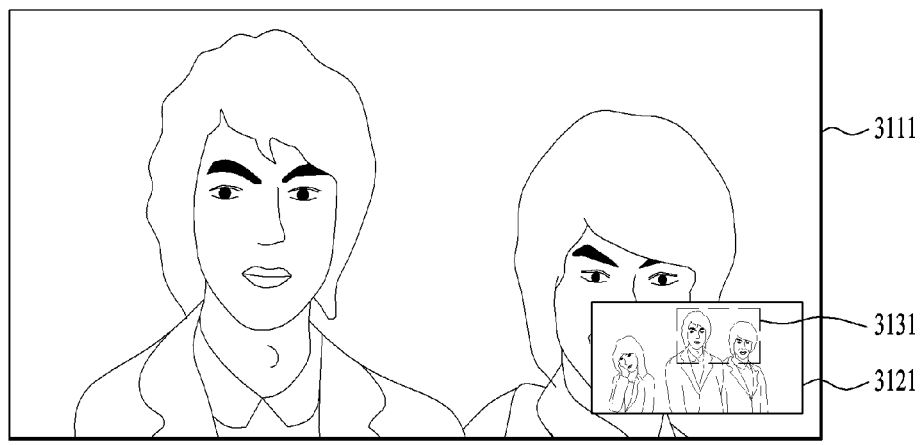

FIG. 32
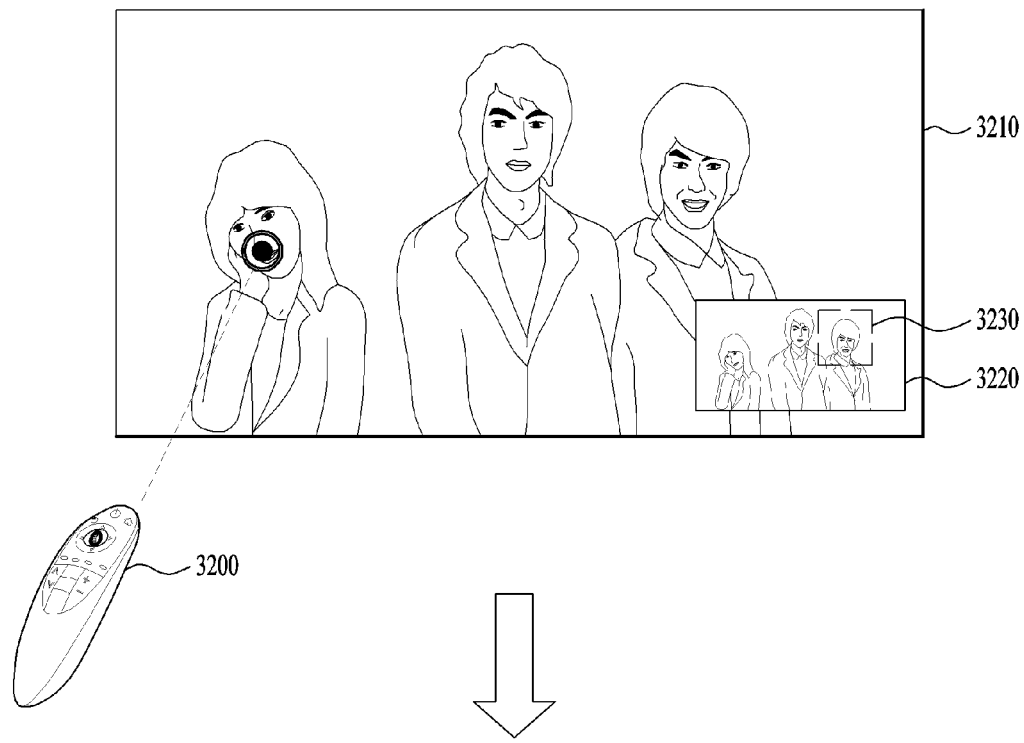
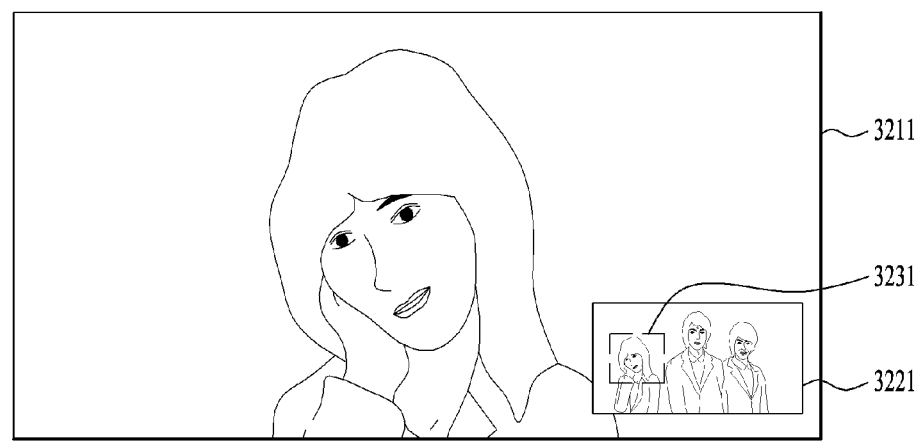

FIG. 33
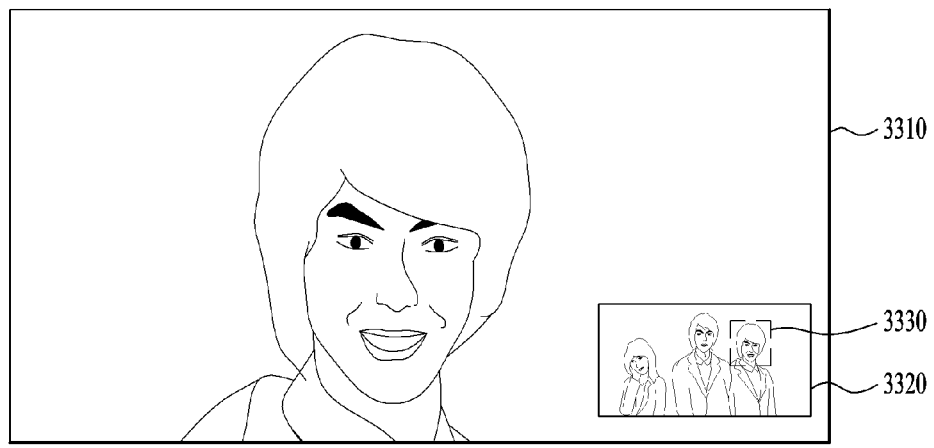
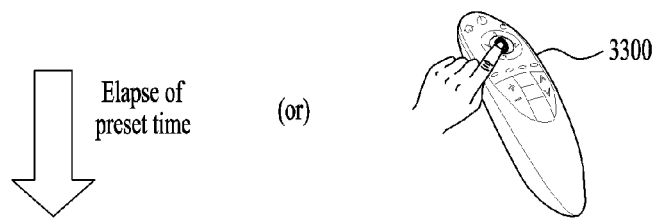
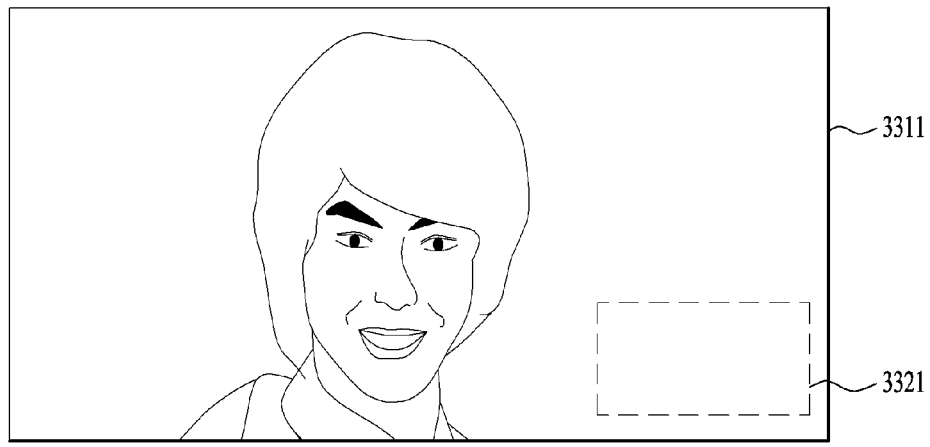

FIG. 34
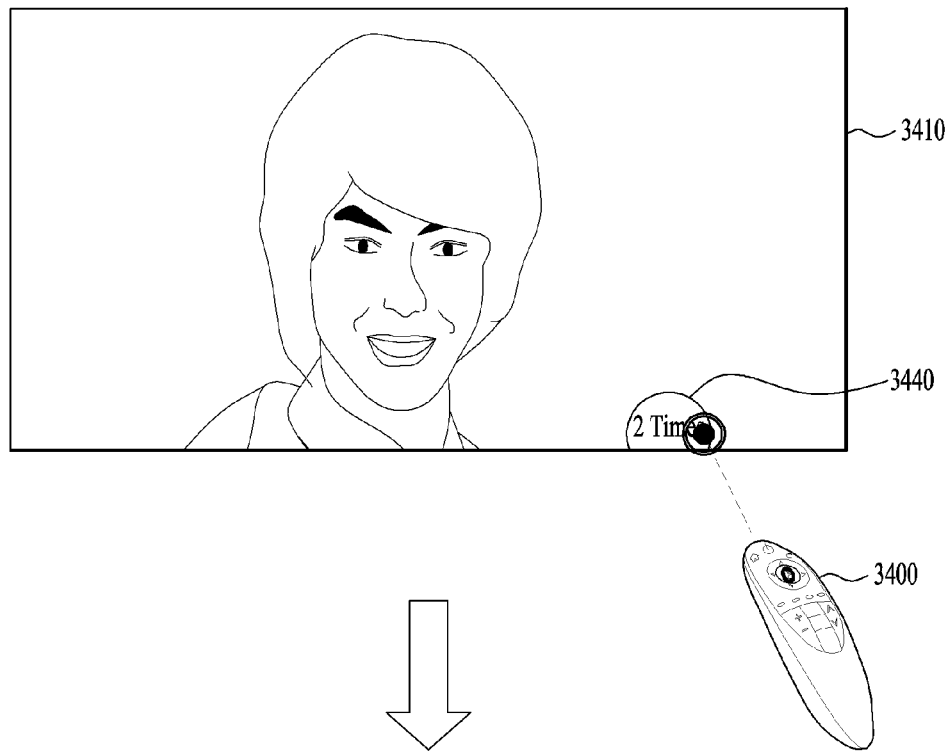
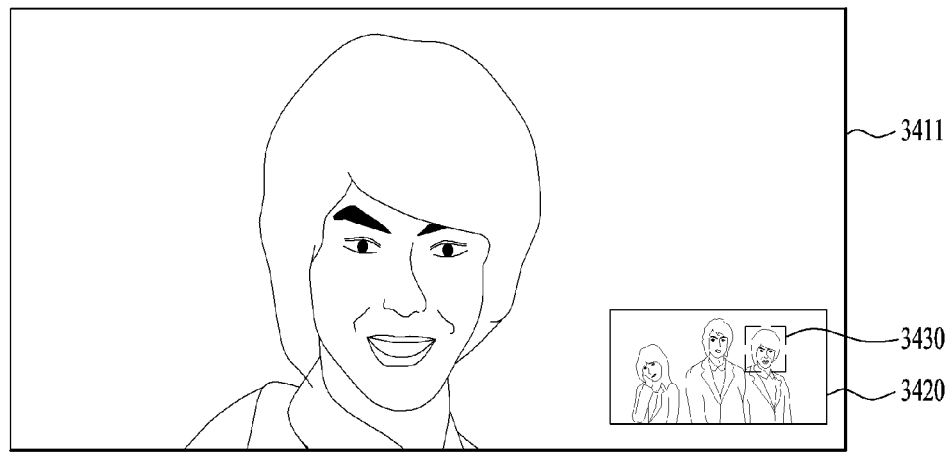

DISPLAY DEVICE AND CONTROLLING METHOD THEREOF

Pursuant to 35 U.S.C. §119(a), this application claims the benefit of earlier filing date and right of priority to Korean Applications Nos. 10-2015-0033736, filed on Mar. 11, 2015 and 10-2015-0047263, filed on Apr. 3, 2015, the contents of which are hereby incorporated by reference herein in their entirety.

BACKGROUND OF THE INVENTION

Field of the Invention

The present invention relates to a display device, and more particularly, to a display device and controlling method thereof. Although the present invention is suitable for a wide scope of applications, it is particularly suitable for enlarging a user desired portion of an image, adjusting a location of the enlarged portion, and modifying a screen enlargement magnification, on a smart TV, STB or the like.

Discussion of the Related Art

Recently, a number of users have used display devices such as a smart TV and the like. According to the related art, a user can enlarge a full screen or adjust a screen ratio using a screen ratio adjustment function. However, a function of only enlarging a user desired specific portion on a screen has not been supported.

For instance, on a TV home shopping channel, a user may want to watch and enlarge a detailed part and a price information of a product. According to the related art, because the adjustment of the screen ratio or an enlargement of the full screen is only supported, it is difficult for a user to enlarge the desiring portion at a time and to recognize which portion of an original screen is enlarged, thereby causing inconvenience to the user.

SUMMARY OF THE INVENTION

Accordingly, embodiments of the present invention are directed to a display device and controlling method thereof that substantially obviate one or more problems due to limitations and disadvantages of the related art.

One object of the present invention is to provide a display device and controlling method thereof, by which a specific area is enlarged only while outputting video data.

Another object of the present invention is to provide a display device and controlling method thereof, by which GUI (graphic user interface) capable of enabling a user to check an enlarged specific area of original video data more quickly and easily is provided.

Still another object of the present invention is to provide a display device and controlling method thereof, by which a problem that a coordinate information of video data of a broadcast signal and a coordinate information of a remote controller are different from each other is solved.

Another further object of the present invention is to provide a display device and controlling method thereof, by which a solution for automatically executing a specific area enlargement mode in accordance with a category information of video data is provided.

Technical tasks obtainable from the present invention are non-limited by the above-mentioned technical tasks. And, other unmentioned technical tasks can be clearly understood from the following description by those having ordinary skill in the technical field to which the present invention pertains. Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of controlling a display device according to one embodiment of the present invention may include the steps of displaying a content on a main screen of the display device, entering an enlargement mode in accordance with an enlargement input request received from a remote controller, displaying an window including the content displayed on the main screen, displaying an indicator for selecting a specific area of the displayed content within the displayed window, enlarging the selected specific area of the displayed content, and displaying the enlarged selected specific area of the displayed content on the main screen, wherein the content corresponds to a video.

In another aspect of the present invention, a display device according to another embodiment of the present invention may include a display module configured to display a content on a main screen of the display device, an interface module configured to receive an enlargement input request from a remote controller and a controller controlling both of the display module and the interface module, the controller entering an enlargement mode in accordance with the enlargement input request received from the remote controller, the controller displaying an window including the content displayed on the main screen, the controller displaying an indicator for selecting a specific area of the displayed content within the displayed window, the controller enlarging the selected specific area of the displayed content, the controller displaying the enlarged selected specific area of the displayed content on the main screen. The content corresponds to a video.

Accordingly, the present invention provides the following effects and/or advantages.

First of all, according to one embodiment of the present invention, a technique for enlarging a specific area only while outputting video data is provided.

Secondly, according to another embodiment of the present invention, a GUI capable of enabling a user to check an enlarged specific area of original video data more quickly and easily is provided.

Thirdly, according to another embodiment of the present invention, a technical effect of solving a problem that a coordinate information of video data of a broadcast signal and a coordinate information of a remote controller are different from each other is provided.

Fourthly, according to further embodiment of the present invention, a solution for automatically executing a specific area enlargement mode in accordance with a category information of video data is provided.

Effects obtainable from the present invention are non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 14 is a block diagram illustrating an internal configuration of the remote controller for controlling a display apparatus in accordance with an embodiment of the present invention;

FIG. 21 is a diagram of controlling a screen using a remote controller in case of activating a specific area enlargement mode according to one embodiment of the present invention;

FIG. 27 is a diagram illustrating solving a case of coordinates of a remote controller not identical to those of input video according to one embodiment of the present invention;

FIG. 28 is a diagram illustrating solving a case of a specific area desired to enlarge out of a video output range according to one embodiment of the present invention;

FIG. 29 is a diagram of an enlarged screen displayed by partitioning a screen into a prescribed number of partitioned screens while outputting video data, having a prescribed one of the partitioned screens selected by a user, and then enlarging the selected screen according to one embodiment of the present invention;

FIG. 31 is a diagram of a process for adjusting an enlargement rate while executing a specific area enlargement mode according to one embodiment of the present invention;

FIG. 32 is a diagram of a process for selecting an enlargement area while executing a specific area enlargement mode according to one embodiment of the present invention;

FIG. 33 is a diagram of a process for removing a related indicator while executing a specific area enlargement mode according to one embodiment of the present invention; and FIG. 34 is a diagram of a process for displaying a removed related indicator again while executing a specific area enlargement mode according to one embodiment of the present invention.

DETAILED DESCRIPTION OF THE INVENTION

Figure 1:
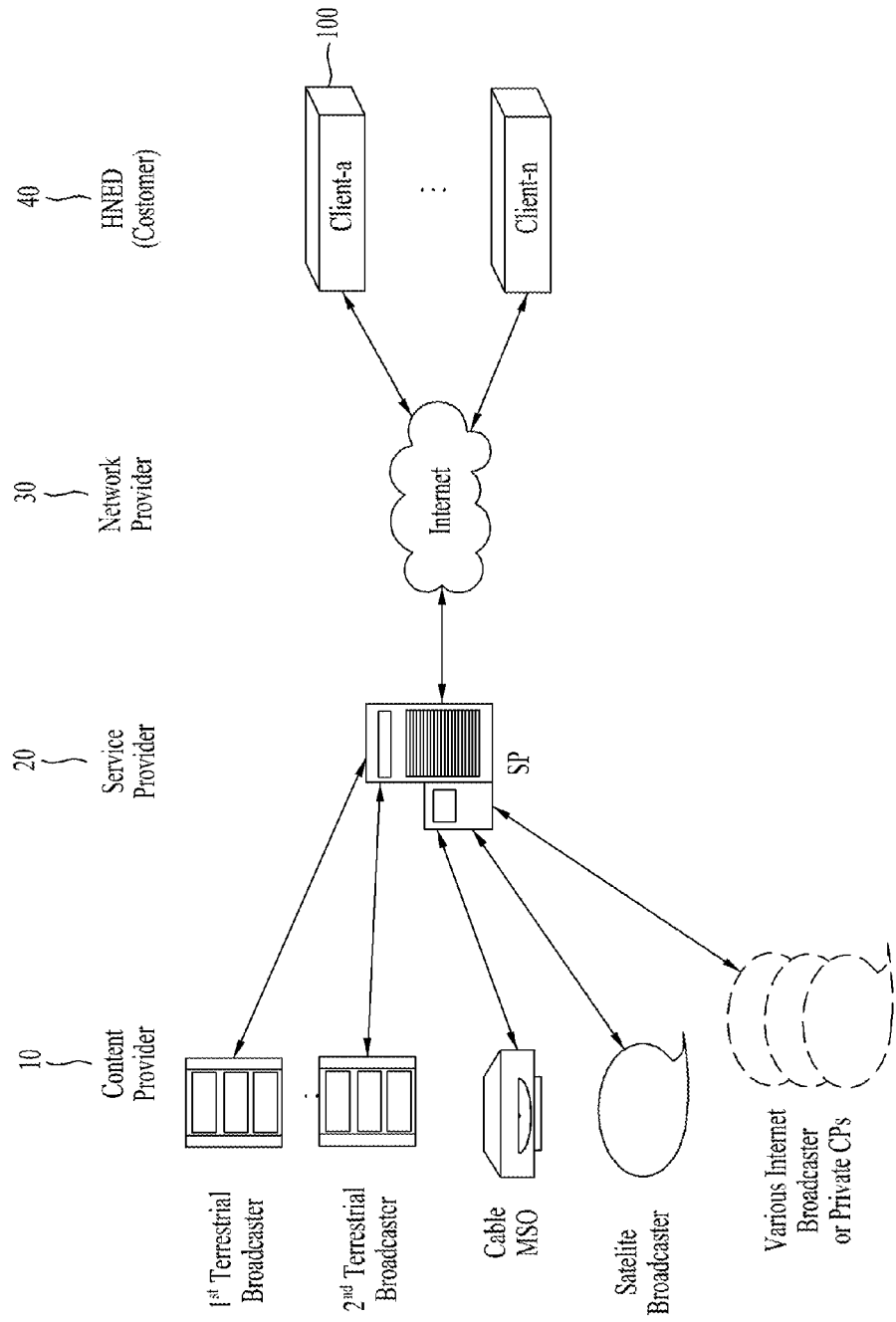
FIG. 1 is a schematic diagram illustrating a service system including a digital device according to one embodiment of the present invention.

Description will now be given in detail according to embodiments disclosed herein, with reference to the accompanying drawings. In general, a suffix such as "module" and "unit" may be used to refer to elements or components. Use of such a suffix herein is merely intended to facilitate description of the specification, and the suffix itself is not intended to give any special meaning or function. Meanwhile, such an ordinal number as 'first-', 'second-' and the like may have a meaning of an order. Yet, the terminologies can be used for the purpose of distinguishing one component from another component capable of being overlapped with each other.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

A digital device according to an embodiment of the present invention as set forth herein may be any device that can handle any one of transmitting, receiving, handling and outputting data, content, servicer, application, and so forth. The digital device may be connected to other digital devices through a wired network or wireless network, paired or connected to external server, and through the connections, the digital device can transmit and receive the prescribed data. Examples of the digital device include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), a smart phone, a tablet PC, or a Notebook computer. For convenience of description, in this specification, the Digital TV is used in FIG. 2 and the mobile device is used in FIG. 3 depicting the digital device. Further, the digital device in this specification may be referred to configuration having only a panel, set-top box (STB), or a set including the entire system.

Moreover, the wired or wireless network described in this specification may refer to various pairing methods, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device. Meanwhile, the digital device can perform intelligent functions such as receiving broadcasting program, operating computer functions, and supporting at least one external input, and by being connected through the network wired or wirelessly, the digital device can support e-mail functions, web browsing functions, banking, gaming, and executing applications. The digital device may further include an interface for any one of input or control mechanism (hereinafter referred as "input means") supporting handwriting input, touch-screen, and space remote control.

Furthermore, the digital device may use a standard operating system (OS), however, the digital device described in this specification and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input mechanisms or digital devices, capable of transmitting and receiving data through wired or wireless network connected to and from the digital device. For example, the external input includes HDMI, game devices such as a Playstation or an X-Box, a smart phone, a tablet PC, a printing device such as a pocket photo, digital devices such as a smart TV and a blue-ray device.

The "server" referred to as in this application includes a digital device or system capable of transmitting and receiving data to and from client, and may also be referred to as a processor. For example, the server may be servers providing services such as a portal server providing web page, a web content or a web service, an advertising server providing advertising data, a content server, a Social Network Service (SNS) server providing an SNS service, a service server providing a service to a manufacturer, a Multichannel Video Programming Distributor (MVPD) providing a Video on Demand (VOD) or a streaming service, and a service server providing pay services. In this application, when an application is described for the convenience of explanation, the meaning of application in the context may include services as well as applications.

In the following description, various embodiments according to an embodiment of the present invention are explained with reference to attached drawings. In particular, FIG. 1 is a schematic diagram illustrating a service system including a digital device according to one embodiment of the present invention. Referring to FIG. 1, examples of a service system including a digital receiver include a content provider (CP) 10, a service provider (SP) 20, a network provider (NP) 30, and a home network end user (FINED) (Customer) 40. The FINED 40 includes a client 100, that is, a digital device.

The CP 10 produces and provides content. Referring to FIG. 1, the CP 10 can include a first or second terrestrial broadcaster, a cable system operator (SO), a multiple system operator (MSO), a satellite broadcaster, various Internet broadcasters, private content providers (CPs), etc. The CP 10 can produce and provide various services or applications as well as broadcast content.

Further, the SP 20 service packetizes content provided by the CP 10 and provides the content to the FINED 40. For example, the SP 20 packetizes at least one content provided by the first or second terrestrial broadcaster, the cable SO, the MSO, the satellite broadcaster, various Internet broadcasters, the private CPs for service and provides it to the FINED 40. The SP 20 can provide services to the client 100 in a uni-cast or multi-cast manner. Meanwhile, the SP 20 can transmit data to plurality of clients which are previously registered at once, and Internet Group Management Protocol (IGMP) may be used in transmission.

The CP 10 and the SP 20 can be configured in the form of one entity. For example, the CP 10 can function as the SP 20 by producing content and directly packetizing the produced content into services, and vice versa. In addition, the NP 30 can provide a network environment for data exchange between the CP 10 and/or SP 20 and the client 100.

The client 100, a consumer included in the FINED 40, can construct a home network, receive data and transmit/receive data for various services or applications such as a VOD, a streaming, and the like, via the NP 30. The CP 10 and/or SP 20 included in the service system can use a conditional access or a content protection mechanism for protecting content transmitted. In this instance, the client 100 can use a processing mechanism such as a cable card (or Point of Deployment (POD)) or a downloadable conditional access system (DCAS), for the conditional access or protecting content.

In addition, the client 100 can use a bi-directional service through a network. In this instance, the client 100 can perform or function as the CP 10. In addition, the SP 20 can transmit it to another client. In FIG. 1, the CP 10 and/or SP 20 can be a server providing service which specifies below in the disclosure. In this instance, the server can include the NP 30, if necessary. Further, service or service data can include not only a service or application received from the external server, but also an internal service or application as mentioned above. This service or application is a defined service data or application data for the client 100 based on the Web OS.

Figure 2:
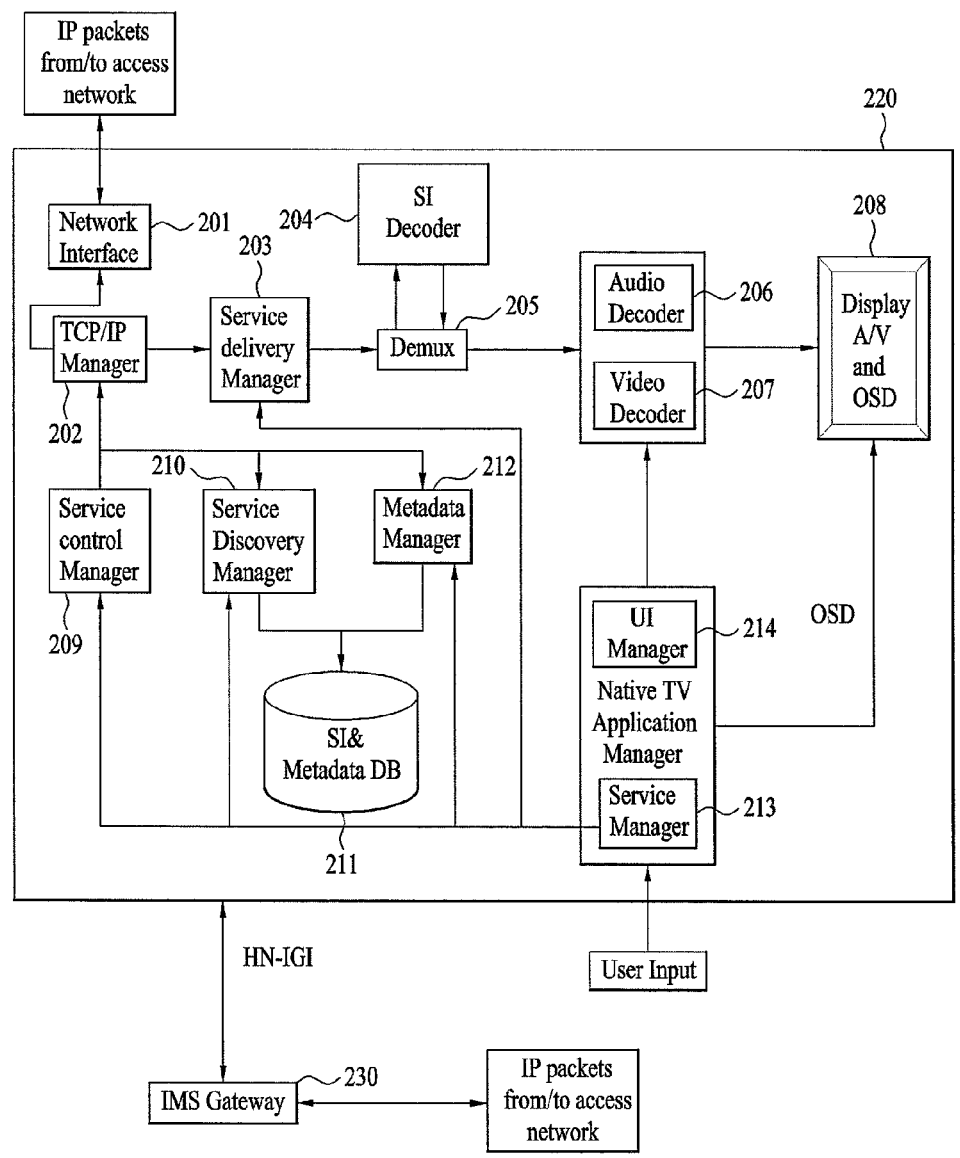
FIG. 2 is a block diagram illustrating a digital device according to one embodiment of the present invention.
Figure 3:
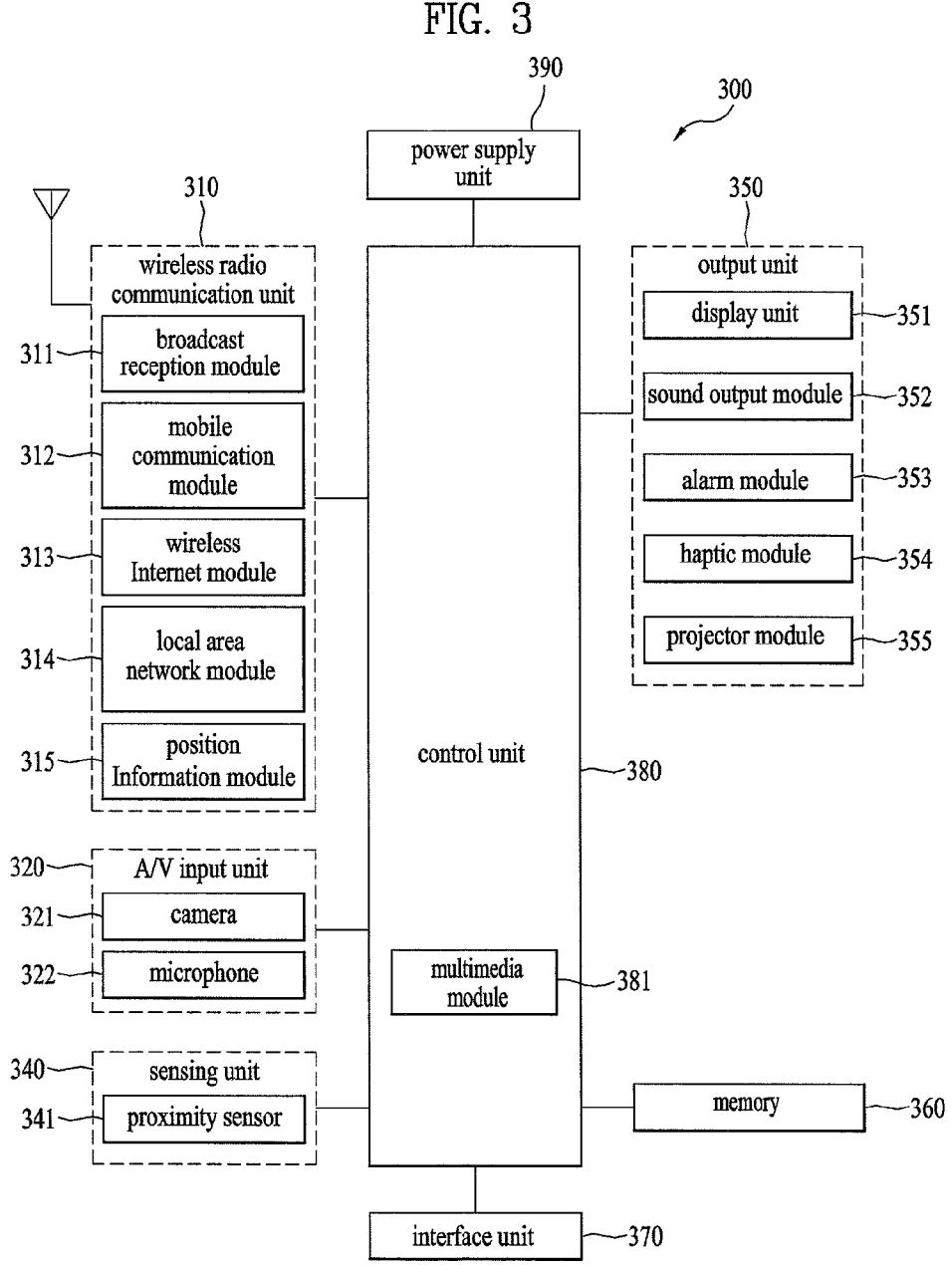
FIG. 3 is a block diagram illustrating the digital device according to another embodiment of the present invention.

Next, FIG. 2 is a block diagram showing a digital device according to one embodiment of the present invention. In the disclosure, the digital device can correspond to the client 100 shown in FIG. 1. The digital device 220 can include a network interface 201, a TCP/IP (Transfer Control Protocol/Internet Protocol) manager 202, a service delivery manager 203, an SI (System Information, Service Information or Signaling Information) decoder 204, a demultiplexer 205, an audio decoder 206, a video decoder 207, a display A/V (Audio/Video) and OSD (On Screen Display) module 208, a service control manager 209, a service discovery manager 210, a SI & metadata database (DB) 211, a metadata manager 212, a service manager 213, a UI (User Interface) manager 214, etc.

The network interface 201 can receive or transmit IP (Internet Protocol) packets or IP datagrams (hereinafter, referred as IP packets) through an accessed network. As an example, the network interface 201 can receive service, application, content, etc., from the SP 20 of FIG. 1 through the network. The TCP/IP manager 202 is involved in packet delivery of IP packets transmitted to the digital device 220 and IP packets transmitted from the digital device 220 between a source and a destination. The TCP/IP manager 202 may classify received packets according to an appropriate protocol and output the classified packets to the service delivery manager 205, the service discovery manager 210, the service control manager 209, and the metadata manager 212, etc.

The service delivery manager 203 can control received service data. For example, the service delivery manager 203 can use Real-Time Protocol/Real-Time Control Protocol (RTP/RTCP) to control real-time streaming data. If the real-time streaming data is transmitted using the RTP, the service delivery manager 203 can parse a received real-time streaming data packet, transmitted based on the RTP, and transmit the parsed data packet to the demultiplexer 205 or store the parsed data packet in the SI & metadata DB 211 under the control of the service manager 213. The service delivery manager 203 can also provide feedback of the network reception information to the server based on the RTCP.

The demultiplexer 205 can demultiplex audio data, video data, SI data from a received packet and transmit the demultiplexed data to each of the audio/video decoder 206/207 and the SI decoder 204. The SI decoder 204 can decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 can also store the decoded SI data in the SI & metadata DB 211. Further, the SI data stored in the SI & metadata DB 211 can be read and extracted by a component which requires the SI data according to a user request, for example.

The audio decoder 206 and the video decoder 207 can decode the demultiplexed audio and video data, respectively. The decoded audio data and video data can be provided to the user through the display unit 208. The application manager can include the service manager 213 and the UI manager 214, for example. The application manager can perform a function of the controller of the digital device 220. In other words, the application manager can administrate the overall state of the digital receiver 200, provides a UI, and manage other mangers.

The UI manager 214 can provide a graphic user interface (GUI)/UI for the user using OSD, etc. And, the UI manager 214 can receive a key input from the user and perform an operation of the device in response to the received key input. For example, the UI manager 214 can transmit a key input signal to the service manager 213 if the key input signal of selecting a channel is received from the user.

The service manager 213 can control service-related managers such as the service delivery manager 203, the service discovery manager 210, the service control manager 209, and the metadata manager 212. The service manager 213 can generate a channel map and control a channel selection using the generated channel map according to the received key input from the UI manager 214. The service manager 213 can receive service information from the SI decoder 204 and set audio/video PID (packet identifier) of a selected channel to the demultiplexer 205. The set audio/video PID can be used for the demultiplexing procedure. Accordingly, the demultiplexer 205 can filter the audio data, video data and SI data using the PID (PID filtering or section filtering.)

The service discovery manager 210 can provide information required to select a service provider that provides a service. Upon receipt of a signal for selecting a channel from the service manager 213, the service discovery manager 210 discovers or searches a service based on the received signal. The service control manager 209 can select and control a service. For example, the service control manager 209 can use perform service selection and control using IGMP or real time streaming protocol (RTSP) when the user selects a live broadcast service, and using RTSP when the user selects a VOD service. The RTSP can provide a trick mode for the real-time streaming. Also, the service manager 213 can initialize and manage a session through the IMS (IP Multimedia Subsystem) gateway 250 using IMS and SIP (Session Initiation Protocol.) The above protocols are just an example and other protocols can be used depending on an implementation.

The metadata manager 212 can manage metadata regarding services and store metadata in the SI & metadata DB 211. The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data, etc. The SI & metadata DB 211 can be implemented using a Non-Volatile RAM (NVRAM) or a Flash memory, and the like. An IMS gateway 230 can be a gateway that collects functions required to access IPTV services based on an IMS.

Next, FIG. 3 is a block diagram illustrating the digital device according to another embodiment of the present invention. FIG. 2 explained above refers to a standing device as according to an embodiment of the digital device, but FIG. 3 refers to a mobile device as another embodiment of the digital device With reference to FIG. 3, the mobile terminal 300 can include a wireless communication unit 310, an A/V input unit 320, an user input unit 330, a sensing unit 340, an output unit 350, a memory 360, an interface unit 370, a controller 380, and a power supply unit 390. Each element is explained in detail as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication or local area network module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 312. The broadcast associated information can be implemented in various forms. For instance, broadcast associated information may include an electronic program guide (EPG) and an electronic service guide (ESG).

The broadcast receiving module 311 may be configured to receive broadcast signals transmitted from various types of broadcast systems. By non-limiting example, such broadcasting systems may include digital video broadcasting-Terrestrial (DVB-T), DVB-Satellite (DVB-S), DVB-Handheld (DVB-H), DVB-Convergence of Broadcasting and Mobile Services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems. The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wi-Fi), Wibro, Wimax, or HSDPA. The short-range communication module 314 facilitates relatively short-range communications. Suitable technologies for implementing this module include RFID, IrDA, UWB, as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 can calculate speed information by continuously calculating a real-time current location.

With continued reference to FIG. 3, the A/V input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display unit 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated while receiving the external audio signal.

Further, the user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 can detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 can sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display unit 351, an audio or sound output module 352, an alarm module 353, a haptic module 354, and a projector module 355. The display unit 351 is typically implemented to visually display (output) information associated with the mobile terminal 300. For instance, if the mobile terminal 300 is operating in a phone call mode, the display will generally provide a UI or GUI which includes information associated with placing, conducting, and terminating a phone call. As another example, if the mobile terminal 300 is in a video call mode or a photographing mode, the display unit 351 can additionally or alternatively display images which are associated with these modes, the UI or the GUI.

The display unit 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (Transparent OLED). A rear configuration of the display unit 351 can be implemented as the optical transmittive type as well. In this configuration, a user can see an object located at the rear of a terminal body on a portion of the display unit 351 of the terminal body.

At least two display units 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display unit 351 and a sensor for detecting a touch action (hereinafter called 'touch sensor') are configured as a mutual layer structure (hereinafter called 'touch screen'), the display unit 351 is usable as an input device as well as an output device. In this instance, the touch sensor can be configured as a touch film, a touch sheet, or a touchpad.

The touch sensor can be configured to convert pressure applied to a specific portion of the display unit 351 or a variation of capacitance generated from a specific portion of the display unit 351 to an electronic input signal. Moreover, the touch sensor is configurable to detect pressure of a touch as well as a touched position or size. If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display unit 351 is touched.

A proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

For example, the proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. Further, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio or sound output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm module 353 outputs a signal for announcing the occurrence of a particular event associated with the mobile terminal 300. Typical events include a call received, a message received and a touch input received. The alarm module 353 can output a signal for announcing the event occurrence by way of vibration as well as video or audio signal. The video or audio signal can be output via the display unit 351 or the audio output module 352. Hence, the display unit 351 or the audio output module 352 can be regarded as a part of the alarm module 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence. The haptic module 354 can generate various tactile effects as well as the vibration. For instance, the haptic module 354 can generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 can perform a pattern (or image) recognizing process for recognizing a writing input and a picture drawing input performed on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
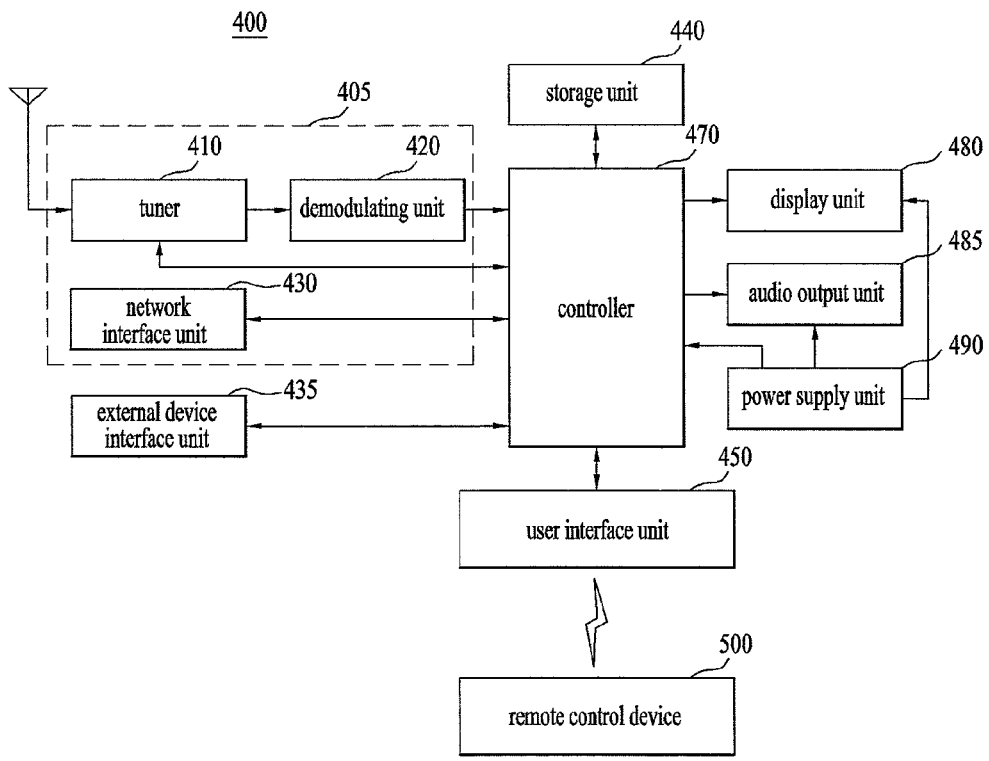
FIG. 4 is a block diagram illustrating the digital device according to the other embodiment of the present invention.

FIG. 4 is a block diagram illustrating the digital device according to another embodiment of the present invention. The digital device 400 according to another embodiment of the present invention can include a broadcast receiving unit 405, an external device interface unit 435, a storage unit 440, a user input interface unit 450, a controller 470, a display unit 480, an audio output unit 485, a power supply unit 490, and a photographing unit. Here, the broadcast receiving unit 405 can include at least one of tuner 410 and a demodulating unit 420, and a network interface unit 430. The broadcast receiving unit 405 can include the tuner 410 and the demodulating unit 420 without the network interface unit 430 network interface unit 430, or can include the network interface unit 430 network interface unit 430 without the tuner 410 and the demodulating unit 420. The broadcast receiving unit 405 can include a multiplexer to multiplex a signal, which is demodulated by the demodulating unit 420 via the tuner 410, and a signal received through the network interface unit 450. In addition, the broadcast receiving unit 405 can include a demultiplexer and demultiplex a multiplexed signal, a demodulated signal, or a signal received through the network interface unit 430.

The tuner 410 can receive a radio frequency (RF) broadcast signal, through an antenna, by tuning to a channel selected by the user or all previously stored channels. Also, the tuner 410 can convert the received RF broadcast signal into an IF (Intermediate Frequency) signal or a baseband signal. For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 410 can process both the digital broadcast signal and the analog broadcast signal. The analog baseband image or a voice signal (CVBS/SIF) output from the tuner 410 can be directly input to the controller 470.

The tuner 410 can receive a RF broadcast signal of single carrier or multiple carriers. The tuner 410 can sequentially tune and receive a RF broadcast signal of all broadcast channel stored by a channel memory function among RF broadcast signal received through an antenna to. And, the tuner 410 can covert the received RF broadcast signal into the DIF (Digital Intermediate Frequency or baseband frequency.) The demodulating unit 420 receives the DIF signal, demodulates the received DIF signal, and performs a channel decoding, etc. For this, the demodulating unit 420 includes a trellis decoder, a de-interleaver, a Reed-Solomon decoder, etc., or includes a convolution decoder, the de-interleaver, the Reed-Solomon decoder, etc.

The demodulating unit 420 can output a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulating unit 420 can be input to the controller 470. The controller 470 can control demultiplexing, processing audio/video signal, etc. Furthermore, the controller 470 can control outputting video through the display unit 480 and outputting audio through the audio output unit 485.

The external device interface unit 435 can provide an environment for interfacing external devices with the digital device 400. To implement this, the external device interface unit 435 can include an A/V input/output unit or an RF communication unit. The external device interface unit 435 can be connected with external devices such as a digital versatile disk (DVD), a Blu-ray player, a game device, a camera, a camcorder, a computer (notebook computer), a tablet PC, a smart phone, a Bluetooth device, a Cloud and the like in a wired/wireless manner. The external device interface unit 435 transfer a signal to the controller 470 of the digital device. The signal includes image data, video data, audio data which is input through an external device. The external device is connected to the digital device. The controller 470 can control to output the signal including the processed image data, the processed video data and the processed audio data to the connected external device. For this, the external device interface unit 435 can further include an A/V input/output unit or a wireless communication unit.

The A/V input/output unit may include a USB terminal, a CVBS terminal, a component terminal, an S-video terminal (analog), a DVI terminal, a HDMI terminal, an RGB terminal, a D-SUB terminal, etc. The RF communication unit can perform near field communication. The digital device 400 can be networked with other electronic apparatuses according to communication protocols such as Bluetooth, RFID, IrDA, UWB, ZigBee, and DLNA, for example.

Also, the external device interface unit 435 can connect a STB via at least one interface described above, and perform an input/output operation with the connected STB. Meanwhile, the external device interface unit 435 can receive application or application list included in a nearby external device, and can transfer the application or the application list to the controller 470 or the storage unit 440.

The network interface unit 430 network interface unit 430 may provide an interface for connecting the digital receiver 400 to wired/wireless networks. For example, the network interface unit 430 network interface unit 430 includes an Ethernet port for connecting to a wire network and, WLAN (Wi-Fi), Wibro, Wimax, HSDPA, and the like for connecting to a wireless network.

Using the network interface unit 430 network interface unit 430, the digital receiver can transmit/receive data to/from other users or other electronic apparatuses or access a predetermined web page through a network connected thereto or another network linked to the connected network. Especially, the network interface unit 430 network interface unit 430 can transmit some part of content data stored in the digital device 400 to another user pre-registered in the digital device 400, a selected user of another digital device, or a selected digital device.

Meanwhile, the network interface unit 430 network interface unit 430 can connect a web page via a connected network or another network linked to the connected network. That is, the network interface unit 430 network interface unit 430 can transmit or receive data to/from a corresponding server by connecting the web page through the network. Additionally, the network interface unit 430 can receive content or data from a CP or an NP. In other words, the network interface unit 430 can receive the content and the content related to a movie, a commercial, a game, a VOD, a broadcast signal, and the like from the CP or the NP through the network. Also, the network interface unit 430 can receive update information of a firmware and an update file from the NP. And, the network interface unit 430 can transmit data to an internet provider, CP or NP.

Also, the network interface unit 430 can select a wanted application among open applications and the selected application via a network. The storage unit 440 may store programs for signal processing and control and store a processed video, audio or data signal. In addition, the storage unit 440 may execute a function of temporarily storing a video, audio or data signal input from the external device interface unit 435 or the network interface unit 430. The storage unit 440 may store information about a predetermined broadcast channel through a channel memory function.

The storage unit 440 can store an application or a list of applications input from the external device interface unit 435 or the network interface unit 430. The storage unit 440 may store various platforms which will be described later. The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470. The user input interface unit 450 may transmit a signal input by the user to the controller 470 or deliver a signal output from the controller 470 to the user.

For example, the user input interface unit 450 can receive control signals such as a power on/off signal, a channel selection signal, an image setting signal, etc. from the remote control device 500 or transmit control signals of the controller 470 to the remote control device 500 according to various communication schemes such as RF communication, IR communication, and the like.

The user input interface unit 450 can transmit control signals input through a power key, a channel key, a volume key, and a local key of a set value to the controller 470. The user input interface unit 450 can transmit a control signal input from a sensing unit which senses a gesture of the user or deliver a signal of the controller 470 to the sensing unit. Here, the sensing unit may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulating unit 420 or the external device interface unit 435 or processing demultiplexed signals. A video signal processed by the controller 470 can be input to the display unit 380 and displayed as an image through the display unit 480. In addition, the video signal processed by the controller 470 can be input to an external output device through the external device interface unit 435.

An audio signal processed by the controller 470 can be applied to the audio output unit 485. Otherwise, the audio signal processed by the controller 470 can be applied to an external output device through the external device interface unit 435. The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel. The controller 470 can control the digital receiver 400 according to a user command input through the user input interface unit 450 or an internal program. Particularly, the controller 470 can control the digital receiver 400 to be linked to a network to download an application or application list that the user desires to the digital receiver 400.

For example, the controller 470 can control the tuner 410 to receive a signal of a channel selected in response to a predetermined channel selection command received through the user input interface unit 450. In addition, the controller 470 can process a video, audio or data signal corresponding to the selected channel. The controller 470 can control information on a channel selected by the user to be output with a processed video or audio signal through the display unit 480 or the audio output unit 485.

Alternatively, the controller 470 can control a video signal or an audio signal received from an external apparatus, for example, a camera or a camcorder through the external device interface unit 435 to be output through the display unit 480 or the audio output unit 485 according to an external device image reproduction command received through the user input interface unit 450.

The controller 470 can control the display unit 480 to display images. For example, the controller 470 can control a broadcast image input through the tuner 410, an external input image received through the external device interface unit 435, an image input through the network interface unit 430, or an image stored in the storage unit 440 to be displayed on the display unit 480. Here, an image displayed on the display unit 480 can be a still image or video, and it can be a 2D or 3D image.

The controller 470 can also control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected, and control installation and execution of applications downloaded from an external network in addition to various UIs. Furthermore, the controller 470 can control an image relating to an application executed by user selection to be displayed on the display unit 480.

The digital receiver 400 may further include a channel browsing processor which generates a thumbnail image corresponding to a channel signal or an external input signal. The channel browsing processor can receive a stream signal (e.g., TS) output from the demodulating unit 420 or a stream signal output from the external device interface unit 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 can convert a video signal, a data signal, and an OSD signal processed by the controller 470 and a video signal and a data signal received from the external device interface unit 435 into RGB signals to generate driving signals. The display unit 480 may be a PDP, an LCD, an OLED, a flexible display, a 3D display or the like. The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers. The digital receiver 400 may further include the sensing unit for sensing a gesture of the user, which includes at least one of a touch sensor, a voice sensor, a position sensor, and an action sensor, as described above. A signal sensed by the sensing unit can be delivered to the controller 470 through the user input interface unit 450.

The digital receiver 400 may further include a photographing unit for photographing the user. Image information acquired by the photographing unit can be supplied to the controller 470. The controller 470 can also sense a gesture of the user from an image captured by the photographing unit or a signal sensed by the sensing unit, or by combining the image and the signal.

The power supply unit 490 supplies power to the digital receiver 400. Particularly, the power supply unit 490 can supply power to the controller 470 which can be implemented as a system-on-chip (SoC), the display unit 480 for displaying images, and the audio output unit 485 for audio output. The power supply unit 490 can include a converter converting a alternating source into a direct source. For example, when the display unit 480 is implemented as a liquid panel including a plurality of backlight lamps, the power supply unit 490 can include an inverter which is capable of performing a Pulse Width Modulation (PWM) for changing or dimming a luminance.

The remote control device 500 may transmit user input to the user input interface unit 450. To achieve this, the remote control device 500 can use Bluetooth, RF communication, IR communication, UWB, ZigBee, etc. In addition, the remote control device 500 can receive audio, video or data signal output from the user input interface 350 and display the received signal or output the same as audio or vibration.

The above-mentioned digital device 400 can be a digital broadcast receiver which is capable of processing a digital broadcast signal of a fixed or mobile ATSC method, or a digital broadcast signal of a DVB method. Some of the components shown in FIG. 2 may be omitted or a component (not shown in FIG. 2) may be added as required. The digital receiver according to an embodiment of the present invention may not include the tuner and the demodulator, differently from the digital receivers shown in FIGS. 2 and 4, and may receive content through the network interface or the external device interface and reproduce the content.

Figure 5:
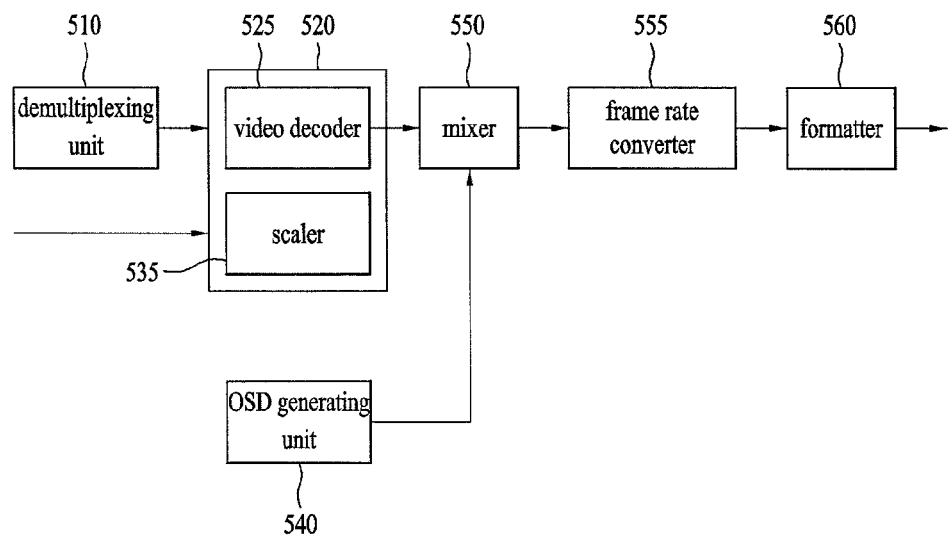
FIG. 5 is a block diagram illustrating the detailed configuration of each of controllers of FIGS. 2 to 4 according to one embodiment of the present invention.

Next, FIG. 5 is a block diagram illustrating the detailed configuration of each of the controllers of FIGS. 2 to 4 according to one embodiment of the present invention. The digital receiver according to an embodiment of the present invention may include a demultiplexing unit 510, an image processor 520, an OSD generating unit 540, a mixer 550, a frame rate converter (FRC) 555, and a 3D formatter (or an Output formatter) 560.

The demultiplexing unit 510 can demultiplex an input stream signal into an MPEG-2 TS image, an audio signal and a data signal, for example. The image processor 520 can process a demultiplexed image signal using a video decoder 525 and a scaler 535. The video decoder 525 can decode the demultiplexed image signal and the scaler 535 can scale the resolution of the decoded image signal such that the image signal can be displayed.

The video decoder 525 can support various standards. For example, the video decoder 525 can perform a function as an MPEG-2 decoder when the video signal is coded in an MPEG-2 standard. The video decoder 525 can perform a function as a H.264 decoder when the video signal is coded in a digital multimedia broadcasting (DMB) method or the H.264 standard method.

The image signal decoded by the image processor 520 is input to the mixer 550. The OSD generating unit 540 can generate OSD data automatically or according to user input. For example, the OSD generating unit 540 may generate data to be displayed on the screen of an output unit in the form of an image or text based on a control signal of a user input interface. OSD data generated by the OSD generating unit 540 may include various data such as a UI image of the digital receiver, various menu screens, widget, icons, and information on ratings. The OSD generating unit 540 can generate a caption of a broadcast image or data for displaying EPG based broadcast information.

The mixer 550 mixes the OSD data generated by the OSD generating unit 540 and the image signal processed by the image processor 520. The mixer 550 then provides the mixed signal to the 3D formatter 560. By mixing the decoded image signal and the OSD data, OSD may be overlaid on a broadcast image or external input image.

The frame rate converter (FRC) 555 converts a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this instance, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor may audio-process a demultiplexed audio signal. The audio processor can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor can include decoders corresponding to the formats to process the audio signals. Furthermore, the audio processor can control base, treble and volume.

In addition, a data processor can process a demultiplexed data signal. For example, when a demultiplexed data signal is encoded, the data processor can decode the encoded demultiplexed data signal. Here, the encoded data signal may be EPG information including broadcast information such as the start time and end time (or duration) of a broadcast program which is broadcast through each channel.

Meanwhile, the above-mentioned digital device, as an embodiment according to the present invention, each component can be integrated, added or omitted according to a capability of the digital device which is actually implemented. That is, if necessary, at least two components are united into a single component or a single component is divided into at least two components. Also, a function performed by each block explains an embodiment of the present invention, but the specific operation or device is not limited to a scope of the present invention.

Meanwhile, the digital device can be an image signal processing device for performing a signal of an input image or an image stored in the device. Other example of the image signal device can be a STB which does not include the display unit 480 and the audio output unit 485 shown in FIG. 4, a DVD player, a Blu-ray player, a game device, a computer, etc.

Figure 6:
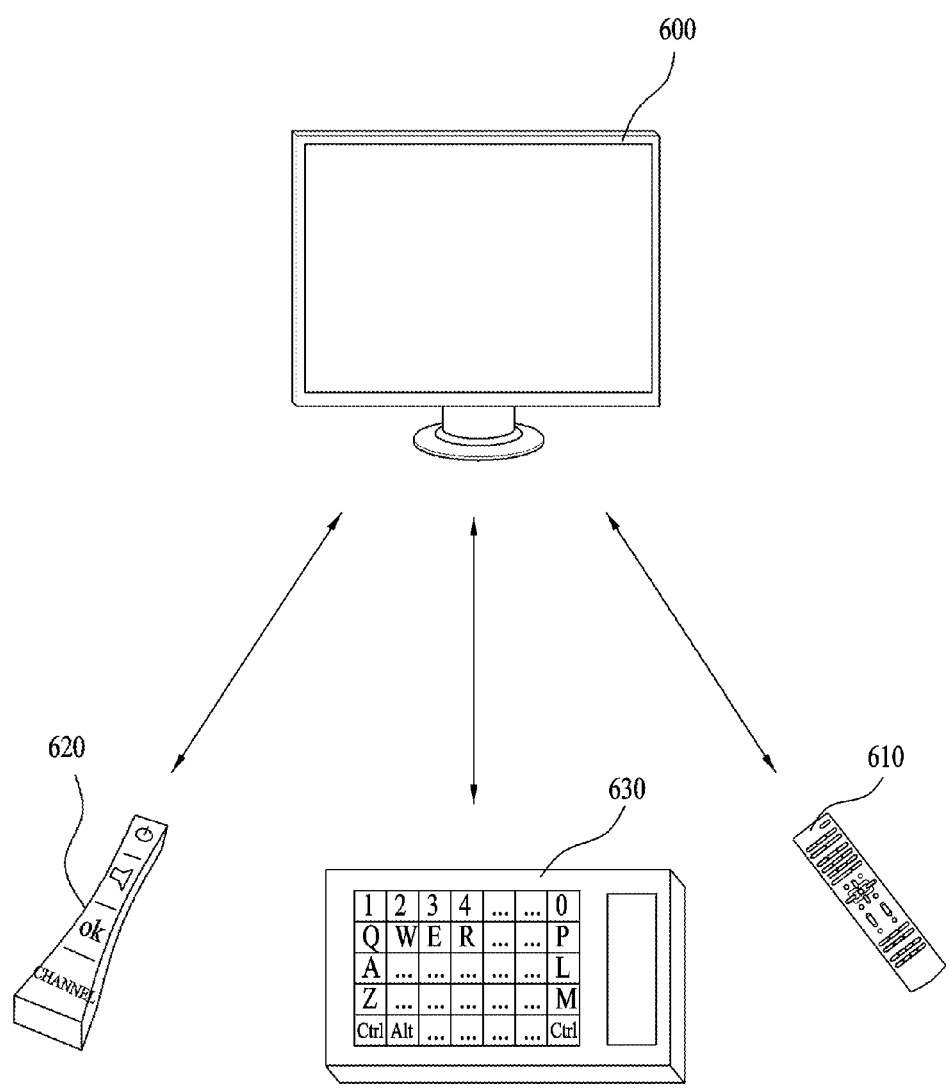
FIG. 6 is a diagram illustrating an input unit connected to each of the digital devices of FIGS. 2 to 4 according to one embodiment of the present invention.

Next, FIG. 6 is a diagram illustrating an input unit connected to each of the digital devices of FIGS. 2 to 4 according to one embodiment of the present invention. To execute various operations for implementing the present invention according to embodiments, various user interface devices (UIDs) which can communicate with a digital receiver 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610. The remote controllers can use various communication protocols such as Bluetooth, RFID, IrDA, UWB, ZigBee, DLNA, etc.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu. The remote controller 630 including the keyboard and touch pad can facilitate text input through the keyboard and control of movement of a pointer and magnification and reduction of a picture or video through the touch pad.

The keyboard 630 has been implemented so that it is similar to a keyboard of a PC in order to conveniently input text because the traditional remote control 610 is not sufficient enough to control the digital device 600 since the digital device 600 offers more than just providing broadcast programs as it did before, but has advanced into an intelligent integrated digital device providing web browser, application, SNS and the like. Meanwhile, the control mechanism such as the remote control 610, the pointing device 620, and the keyboard 630 can, if necessary, include a touchpad to control functions of text input, move the pointer, enlarging/reducing pictures and video clips more conveniently.

The digital device described in the present specification uses Web OS as a platform. Hereinafter, a Web OS based process or algorithm may be performed by the controller of the above-described digital device. The controller includes the controllers of FIGS. 2 to 5 and has wide concepts. Accordingly, hereinafter, a component for processing Web OS based services, applications, content, etc., including software, firmware or hardware in a digital device is referred to a controller.

Such a Web OS based platform improves development independency and functional extensibility by integrating services, applications, etc. based on a Luna-service bus, for example, and increases application development productivity based on web application framework. In addition, system resources, etc. can be efficiently used via a Web OS process and resource management to support multitasking.

A Web OS platform described in the present specification may be available not only for stationary devices such as PCs, TVs and STBs but also for mobile devices such as cellular phones, smartphones tablet PCs, laptops, and wearable devices. A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
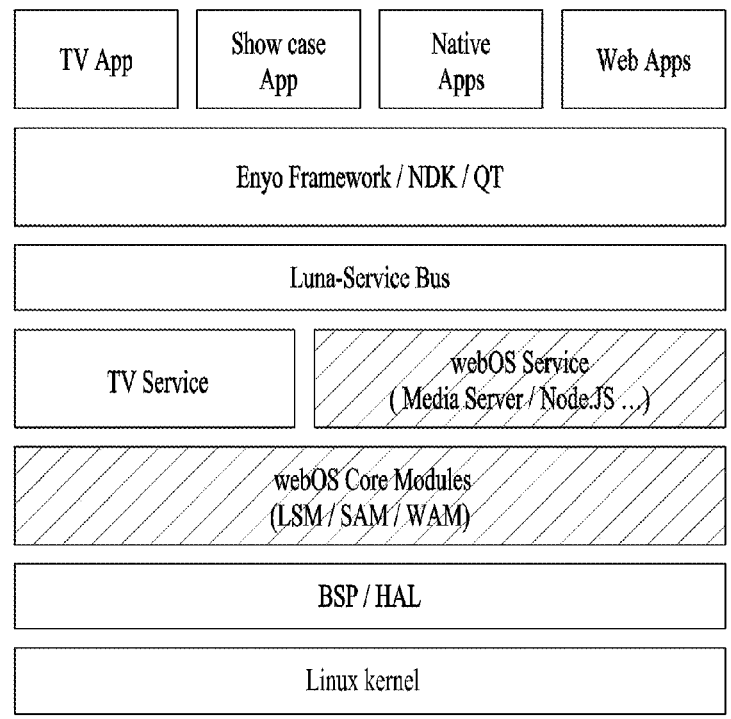
FIG. 7 is a diagram illustrating Web OS architecture according to one embodiment of the present invention.

FIG. 7 is a diagram illustrating a Web OS architecture according to one embodiment of the present invention. The architecture of a Web OS platform will now be described with reference to FIG. 7. The platform may be largely divided into a kernel, a system library based Web OS core platform, an application, a service, etc.

The architecture of the Web OS platform has a layered structure. OSs are provided at a lowest layer, system library(s) are provided at a next highest layer and applications are provided at the highest layer. First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided. Some layers of the above-described Web OS layered structure may be omitted and a plurality of layers may be combined to one layer and one layer may be divided into a plurality of layers.

The Web OS core module layer may include a Luna surface manager (LSM) for managing a surface window, etc., a system & application manager (SAM) for managing execution and performance status of applications, etc., and a web application manager (WAM) for managing web applications based on WebKit. The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications. The WAM is based on Enyo framework, because a Web OS regards a web application as a basic application. An application may use a service via a Luna-service bus. A service may be newly registered via a bus and the application may detect and use a desired service. The service layer may include services having various service levels, such as a TV service, a Web OS service, etc. The Web OS service may include a media server, Node.JS, etc. and, in particular, the Node.JS service supports JavaScript, for example.

The Web OS service may be communicated to a Linux process implementing function logic via a bus. This Web OS service is largely divided into four parts, migrates from a TV process and an existing TV to a Web OS, is developed as services which differ between manufacturers, Web OS common services and JavaScripts, and is composed of the Node.js service used via Node.js.

The application layer may include all applications supportable by a digital device, such as a TV application, a showcase application, a native application, a web application, etc. Applications on the Web OS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and JavaScripts. The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a Qt based native application and includes basic applications provided along with the Web OS platform, such as card view, home dashboard, virtual keyboard, etc. QML is a markup language of a script format, not C++. The native application is an application which is developed and compiled using C/C++ and is executed in the binary form and has an advantage such as high execution speed.

Figure 8:
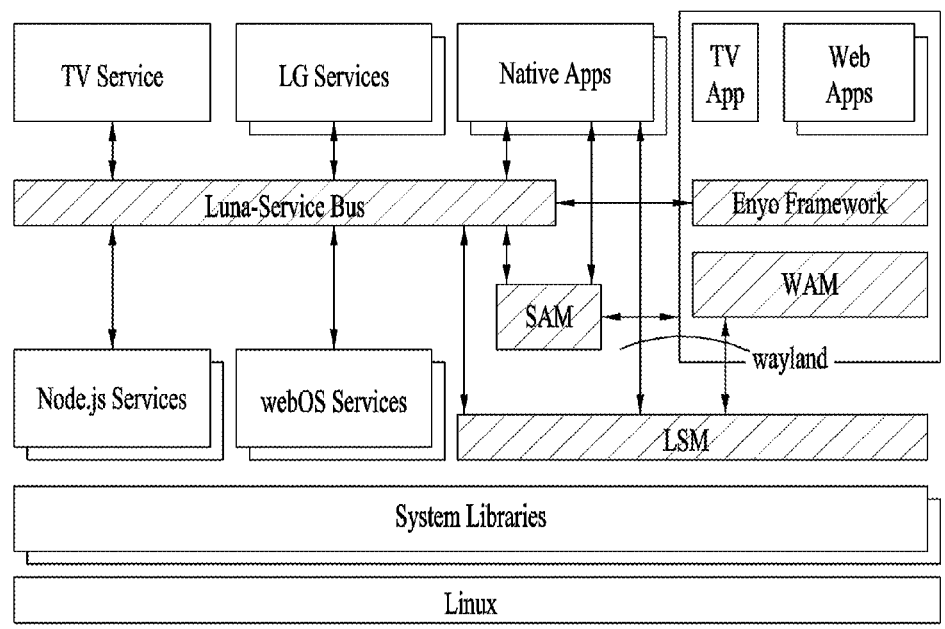
FIG. 8 is a diagram illustrating architecture of a Web OS device according to one embodiment of the present invention.

FIG. 8 is a diagram illustrating the architecture of a Web OS device according to one embodiment of the present invention. In particular, FIG. 8 is a block diagram based on a runtime of a Web OS device and is described with reference to the layered structure of FIG. 7. Hereinafter, a description will be given with reference to FIGS. 7 and 8. Referring to FIG. 8, services, applications and Web OS core modules are included on a system OS (Linux) and system libraries and communication therebetween may be performed via a Luna-service bus.

Node.js services based on HTML5 such as e-mail, contact or calendar, CSS, JavaScript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, now on, notification, search, auto content recognition (ACR), contents list browser (CBOX), wfdd, DMR, remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, DMS, DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on MVC and easily develop code for processing user input. An interface between the QML and the Web OS component is achieved via a QML extensibility plug-in and graphic operation of an application may be based on Wayland protocol, luna-service call, etc.

The LSM is an abbreviation for a Luna surface manager and functions as an application window compositor. The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, auto content recognition (ACR), etc.

Figure 9:
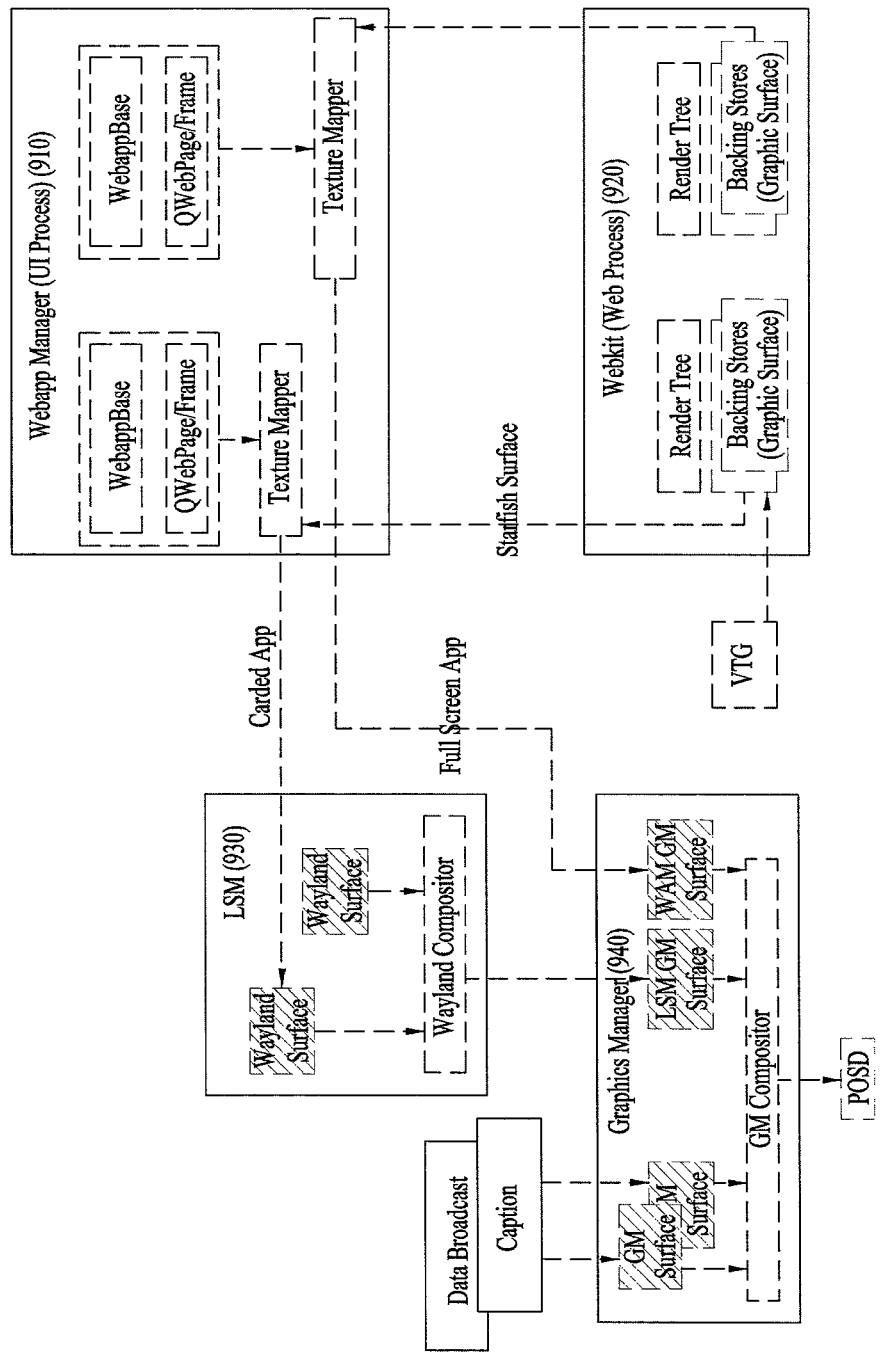
FIG. 9 is a diagram illustrating a graphic composition flow in a Web OS device according to one embodiment of the present invention.

FIG. 9 is a diagram illustrating a graphic composition flow in a Web OS device according to one embodiment of the present invention. Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 may bypass the application. In this instance, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface. The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
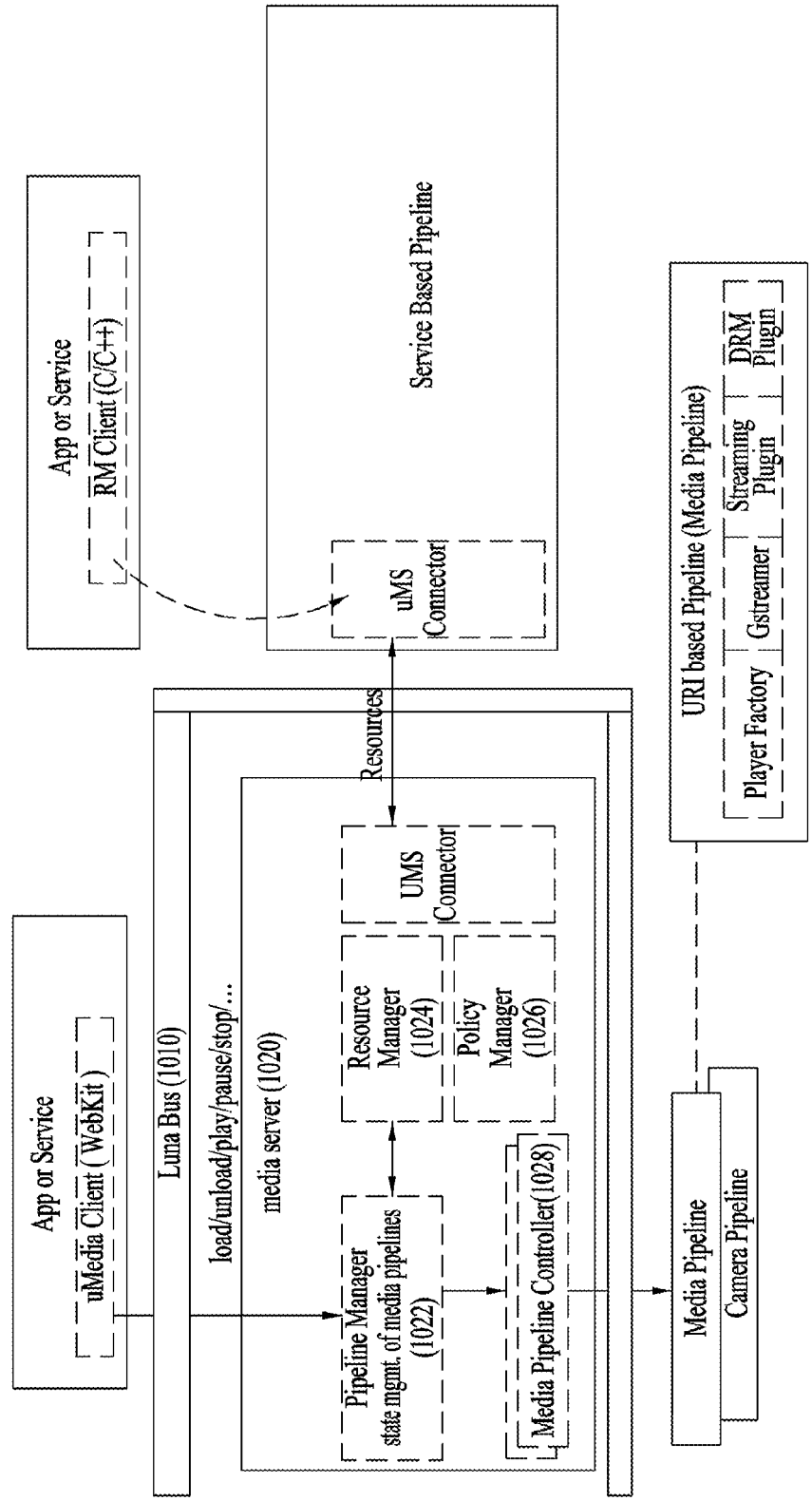
FIG. 10 is a diagram illustrating a media server according to one embodiment of the present invention.
Figure 11:
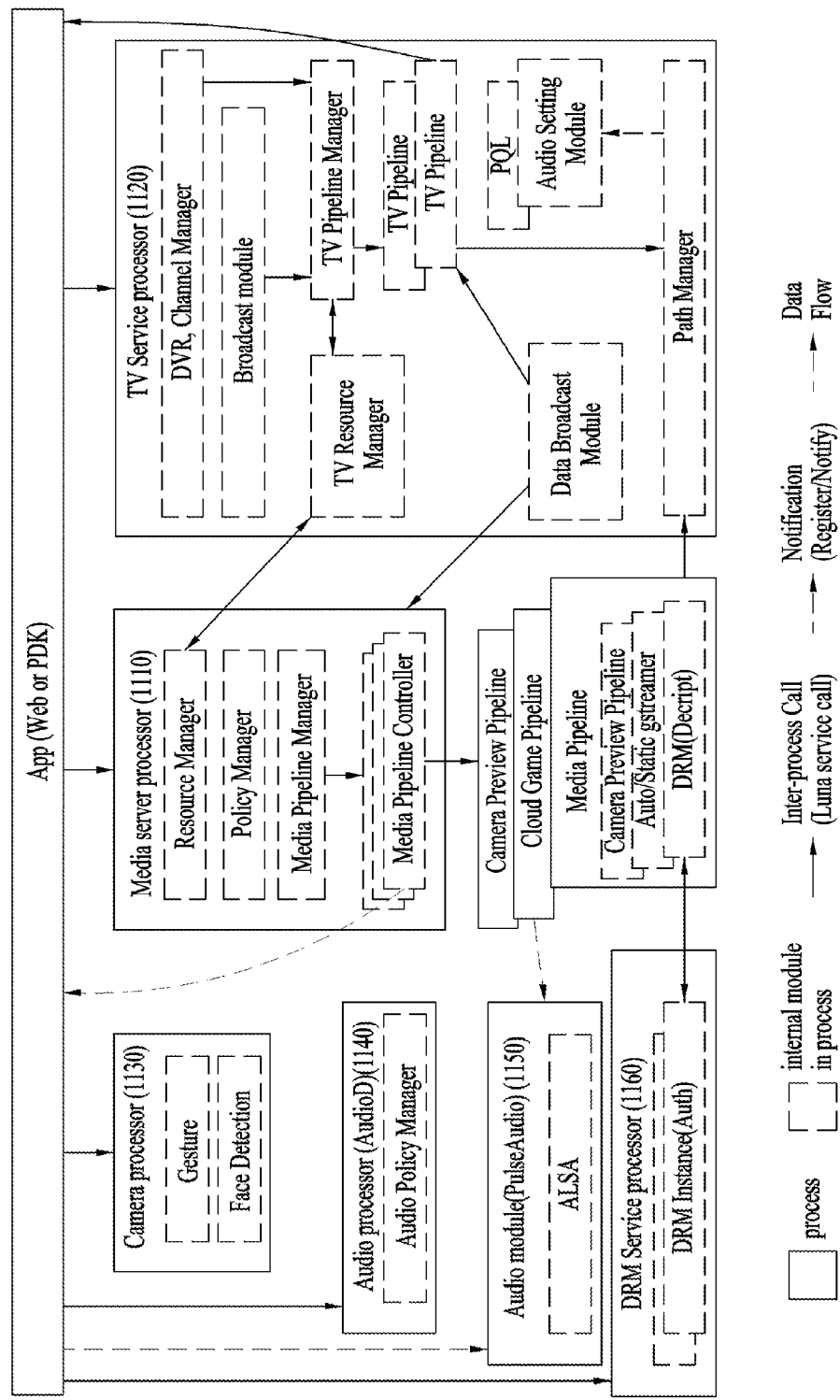
FIG. 11 is a block diagram illustrating a media server according to one embodiment of the present invention.
Figure 12:
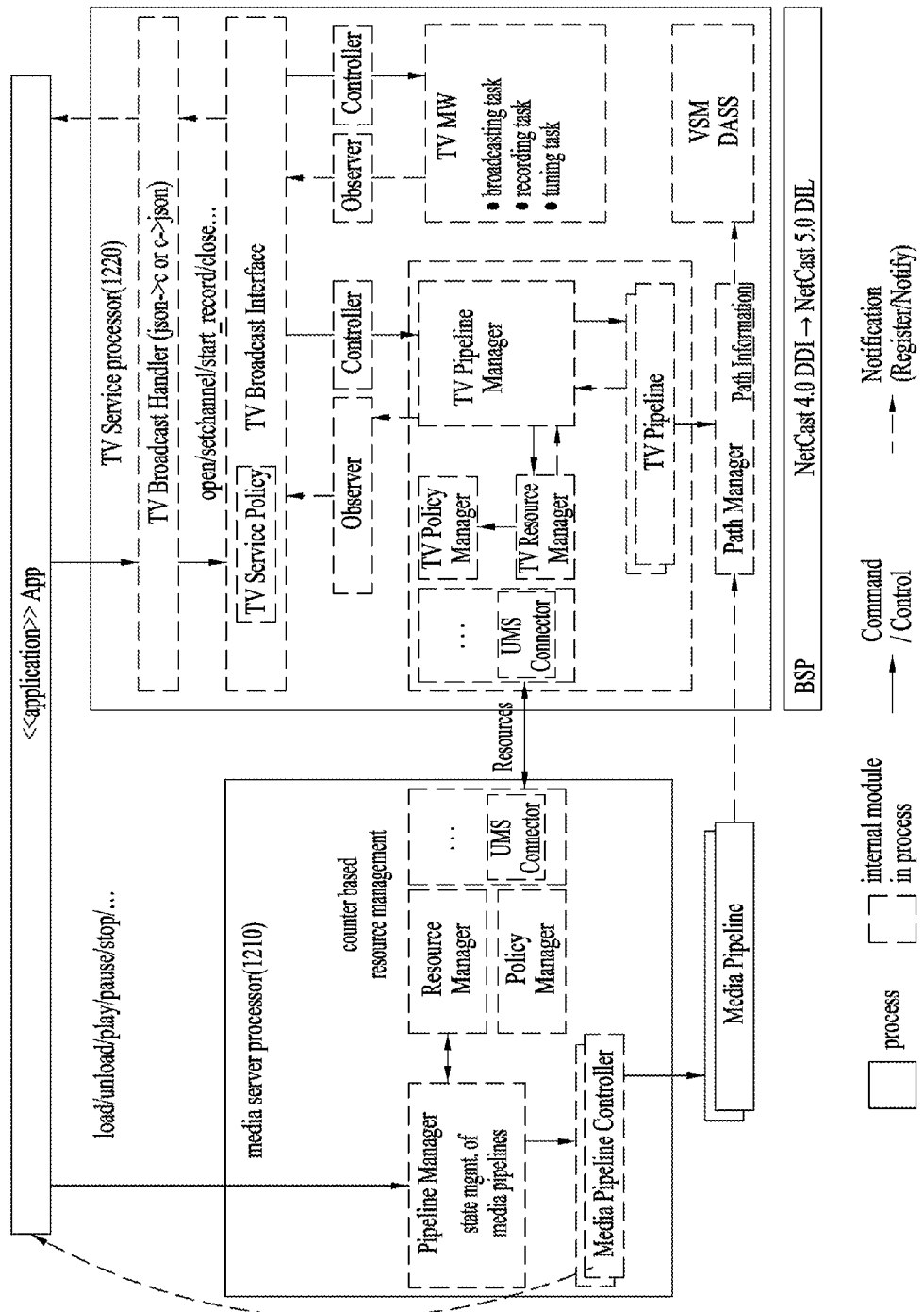
FIG. 12 is a diagram illustrating a relationship between a media server and a TV service according to one embodiment of the present invention.

FIG. 10 is a diagram illustrating a media server according to one embodiment of the present invention, FIG. 11 is a block diagram illustrating a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server makes system stability robust, and removes a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc. The media server may have extensibility and may add a new type of pipeline without influencing an existing implementation method. For example, the media server can accommodate a camera pipeline, a video conference (Skype) pipeline, a third-party pipeline, etc.

The media server can process general media playback and TV task execution as separate services because the interface of the TV service is different from that of media playback. The media server supports operation such as "set channel", "channel up", "channel down", "channel tuning" and "record start" in relation to the TV service and support operation such as "play", "pause" and "stop" in relation to general media playback, that is, supports different operations with respect to the TV service and general media playback and processes the TV service and media playback as separate services.

The media server can control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server can send a command to a specific pipeline based on the ID. The media server can also send respective commands to pipelines for playback of two or more media. The media server is responsible for playing back a HTML5 standard media. The media server performs a service process of a TV pipeline according to a TV restructuralization range. Further, the media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example. The media server mainly manages micro resources such as a resource manager or a policy manager. The media server also controls playback of web standard media content. The media server may manage pipeline controller resources. The media server supports extensibility, reliability, efficient resource usage, etc., for example.

In other words, the uMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline can be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail. In FIG. 10, an application or service is connected to a media server 1020 via a Luna-service bus 1010 and the media server 1020 is connected to and managed by pipelines generated via the Luna-service bus 1010. The application or service includes various clients according to properties thereof and may exchange data with the media server 1020 or the pipeline via the clients. The clients include a uMedia client (WebKit) for connection with the media server 1020 and a resource manager (RM) client (C/C++), for example. The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 1028, with respect to resources assigned according to resource assignment of the resource manager 1024. The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smartshare playback, thumbnail extraction, NDK, cinema, multimedia and hypermedia information coding experts group (MHEG), etc. The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this instance, as described above, the resource manager 1024 may manage resources via appropriate data communication with the policy manager 1026 if necessary for resource management. The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows. An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may also be used. Alternatively, a method of using in existing CP may be used. For backward compatibility, plug-in of an existing platform may be extended and used based on Luna. Lastly, an interface method using a non-Web OS may be used. In this instance, a Luna bus may be directly called to perform interfacing.

Seamless change is processed by a separate module (e.g., TVWIN) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server. In FIG. 11, a solid box denotes a process component and a dotted box denotes an internal processing module of the process. A solid arrow denotes an inter-process call, that is, a Luna-service call and a dotted arrow denotes notification such as register/notify or data flow. The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1160. The application or a pipeline related thereto may notify the audio module 1160 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1170 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described. FIG. 12 shows the media server processor and the TV service processor of FIG. 11 in detail. Accordingly, a description will be given with reference to FIGS. 11 and 12.

First, if the application includes TV service data, the application is processed by the TV service processor 1120/1220. The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present specification, the TV service processor may have the configuration of FIG. 11 or FIG. 12 or a combination thereof. Some components may be omitted or other components may be added. The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this instance, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device. The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted.

In the present specification, the resource manager in the media server processor 1110/1210 may perform resource management to a counter base, for example. Hereinafter, diverse embodiment(s) of the digital device according to an embodiment of the present invention will be described in more detail with reference to the accompanying drawings.

Figure 13C:
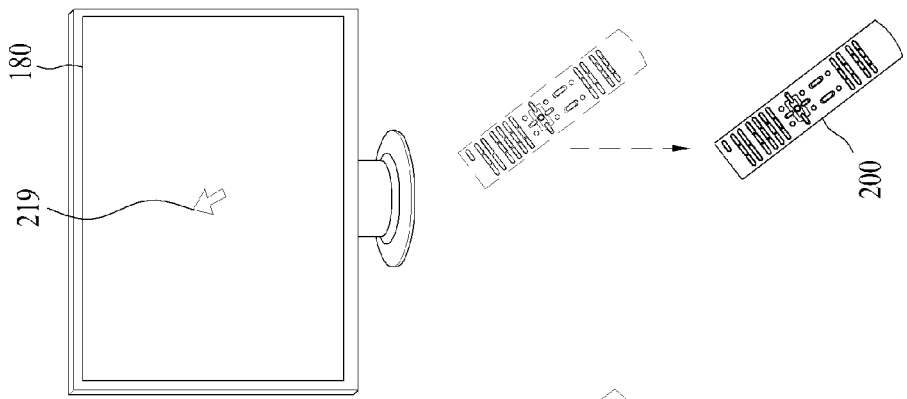
FIGS. 13(a) to 13(c) are overviews illustrating an external appearance of a remote controller to control a display apparatus in accordance with an embodiment of the present invention.
Figure 13B:
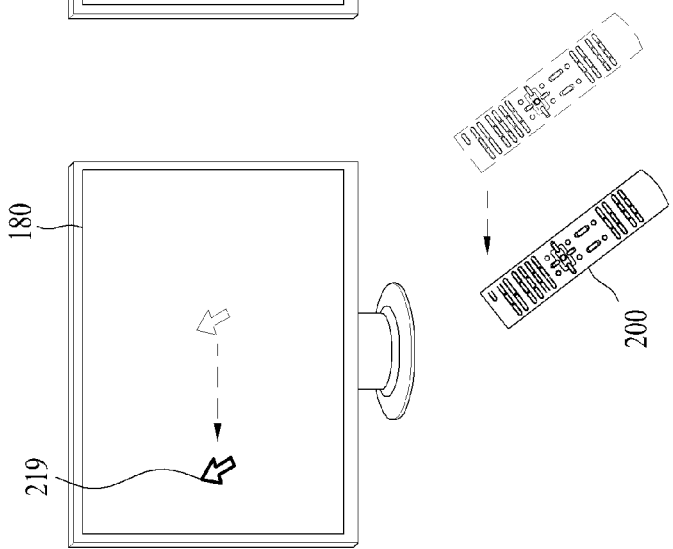
Figure 13A:
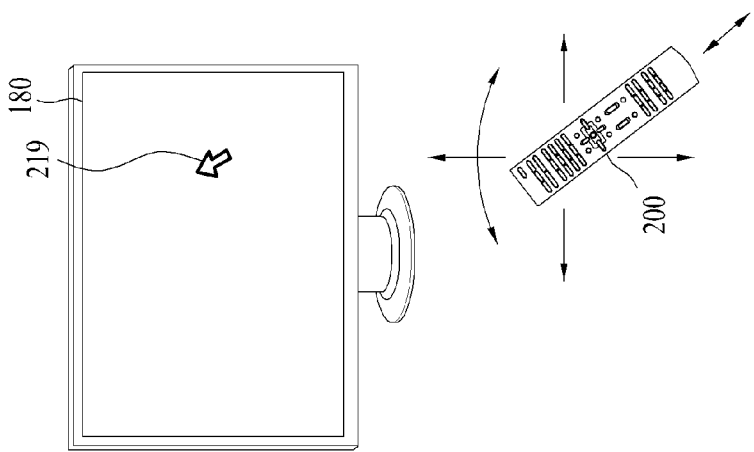

Next, FIGS. 13(*a*) to 13(*c*) are overviews illustrating an external appearance of the remote controller 200 to control the display 180 in accordance with an embodiment of the present invention. In particular, FIG. 13(*a*) illustrates a pointer 219 displayed on the display 180 corresponding to the remote controller 200. Further, the display 180 corresponds to, for example, the display modules of the devices shown in FIGS. 4 to 6.

A user can then move or rotate the remote controller 200 in the upward and downward direction and in the leftward and rightward direction as shown in FIG. 13(*b*) and in the forward and backward direction as shown in FIG. 13(*c*). That is, the movement of the pointer 219 displayed on the display 180 of the image display apparatus corresponds to movement of the remote controller 200. Such a remote controller 200 also moves in a 3D space to move the corresponding pointer 219 as shown in FIGS. 13(*a*) to 13(*c*), and thus may be referred to as a space remote controller.

In addition, FIG. 13(*b*) illustrates that, when the user moves the remote controller 200 leftwards, the pointer 219 displayed on the display 180 of the image display apparatus moves leftwards corresponding to movement of the remote controller 200. Further, information regarding movement of the remote controller 200 sensed by a sensor of the remote controller 200 is transmitted to the image display apparatus. The image display apparatus can also calculate coordinates of the pointer 219 from the information regarding movement of the remote controller 200, and then display the pointer 219 so as to correspond to the calculated coordinates.

Further, FIG. 13(*c*) illustrates the user moving the remote controller 200 away from the display 180 while the user presses a specific button of the remote controller 200. Thereby, a selection region in the display 180 corresponding to the pointer 219 can be zoomed in, thus being enlarged. Further, when the user moves the remote controller 200 towards the display 180, the selection region in the display 180 corresponding to the pointer 219 can be zoomed out, thus being reduced.

Further, when the remote controller 200 moves away from the display 180, the selection region can be zoomed out, and when the remote controller 200 moves towards the display 180, the selection region can be zoomed in. In addition, in order to select an event to be added to the schedule list from the enhanced EPG screen in accordance with an embodiment of the present invention, the remote controller 200 shown in FIGS. 13(*a*) to 13(*c*) can be used, and this will be described in detail later with reference to FIGS. 17 to 21.

Next, FIG. 14 is a block diagram illustrating the internal configuration of the remote controller 200. As shown in FIG. 14, the remote controller 200 includes, for example, a wireless communication unit 225, a user input unit 235, a sensor unit 240, an output unit 250, a power supply unit 260, a storage unit 270 and a controller 280. The wireless communication unit 225 transmits/receives a signal to/from any one of the above-described image display apparatuses in accordance with the embodiments of the present invention. Also, one image display apparatus 100 from among the image display apparatuses in accordance with the embodiments of the present invention will be described.

In this embodiment, the remote controller 200 includes an RF module 221 which can transmit/receive a signal to/from the image display apparatus 100 according to the RF communication standard. Further, the remote controller 200 includes an IR module 223 which can transmit/receive a signal to/from the image display apparatus 100 according to the IR communication standard.

In this embodiment, the remote controller 200 transmits a signal containing information regarding movement of the remote controller 200, etc. to the image display apparatus 100 through the RF module 221. Further, the remote controller 200 can receive a signal transmitted from the image display apparatus 100 through the RF module 221. In addition, the remote controller 200 can transmit a command regarding power ON/OFF, channel change, volume change, etc. to the image display apparatus 100 through the IR module 223.

The user input unit 235 can also include a key pad, a touch pad or a touch screen. A user can then input a command regarding the image display apparatus 100 to the remote controller 200 by manipulating the user input unit 235. Further, the sensor unit 240 includes a gyro sensor 241 and an acceleration sensor 243. The gyro sensor 241 senses information regarding movement of the remote controller 200. For example, the gyro sensor 241 can sense information regarding movement of the remote controller 200 based on x, y and z axes. The acceleration sensor 243 can also sense information regarding the moving velocity of the remote controller 200. The sensor unit 240 may also include a distance sensor for sensing a distance from the display 180.

Further, the output unit 250 can output a video or audio signal corresponding to manipulation of the user input unit 235 or the signal transmitted from the image display apparatus 100. The user can thus recognize whether or not the user input unit 235 is manipulated or whether or not the image display apparatus 100 is controlled through the output unit 250. For example, the output unit 250 includes an LED module 251 that is turned on when the user input unit 235 is manipulated or the signal of the image display apparatus 100 is transmitted/received through the wireless communication unit 225, a vibration module 253 to generate vibration, an audio output module 255 to output audio, and a display module 257 to output an image.

The power supply unit 260 also supplies power to the remote controller 200. Further, the power supply unit 260 stops power supply when the remote controller 200 does not move for a designated time, thereby reducing power consumption. The power supply unit 260 can also resupply power to the remote controller 200 when a designated key provided on the remote controller 200 is manipulated.

In addition, the storage unit 270 can store various kinds of programs used to control or operate the remote controller 200 and application data. If the remote controller 200 transmits/receives a signal to/from the image display apparatus 100 through the RF module 221 wirelessly, the remote controller 200 and the image display apparatus 100 transmit/receive the signal to/from each other through a designated frequency band. The control unit 280 of the remote controller 200 can also store information regarding the frequency band through which the remote controller 200 transmits/receives the signal to/from the image display apparatus 100 paired with the remote controller 200, within the storage unit 270 and refer to the stored information.

The controller 280 also controls various factors regarding control of the remote controller 200. The controller 280 can transmit a signal corresponding to manipulation of the designated key of the user input unit 235 or a signal corresponding to movement of the remote controller 200 sensed by the sensor unit 240 to the image display apparatus 100 through the wireless communication unit 225. Particularly, the user interface of the image display apparatus 100 shown in FIG. 14 can receive a command signal from the remote controller 200 transmitting an input signal according to motion of the user.

Figure 15:
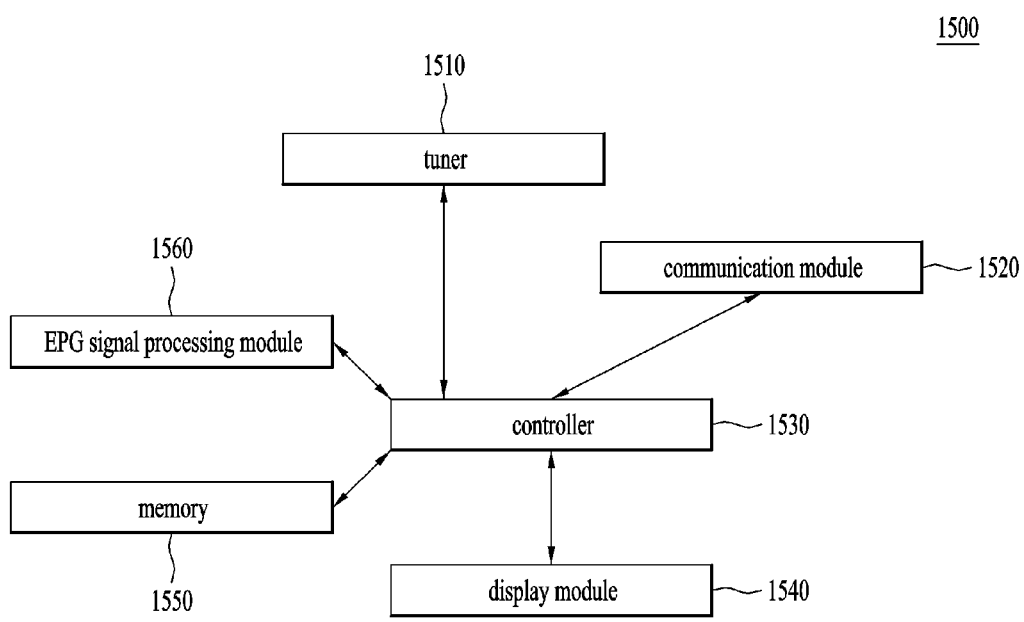
FIG. 15 is a block diagram of a multimedia device according to one embodiment of the present invention.

Next, FIG. 15 is a block diagram of a multimedia device according to one embodiment of the present invention. Referring to FIG. 15, a multimedia device 1500 according to one embodiment of the present invention includes a tuner 1510, a communication module 1520, a controller 1530, a display module 1540, a memory 1550, and an EPG signal processing module 1560. Some of the modules shown in FIG. 15 may be modified or deleted or other modules may be added to the components shown in FIG. 15, without departing from the scope of the appended claims and their equivalents. Moreover, for example, the multimedia device 1500 corresponds to one of a television, an STB (set top box) and the like. Furthermore, FIG. 15 may be supplementarily interpreted with reference to FIG. 2 mentioned in the foregoing description.

The tuner 1510 receives a broadcast signal. Although not shown in FIG. 15, an audio decoder performs decoding on audio data included in the received broadcast signal and a video decoder performs decoding on video data included in the received broadcast signal. The display module 1540 displays the decoded video data on a first area. An interface module (or the communication module 1520) receives at least one command from an external device.

The controller 1530 controls at least one of the tuner 1510, the display module 1540 and the interface module. In addition, the controller 1530 executes a specific area enlargement mode in accordance with the at least one command received from the external device. Moreover, the controller 1530 displays video data corresponding to the video data on a second area within the first area as well. The second area includes an indicator and the video data displayed on the first area is changed depending on at least one of a location of the indicator and a size of the indicator.

According to another embodiment of the present invention, the above-mentioned process can be applied to video data stored in the memory 1550 instead of the broadcast signal. Further, the controller 1530 automatically executes the specific area enlargement mode in accordance with a category information of the received broadcast signal. The category information of the broadcast signal is designed to be processed in the EPG signal processing module 1560. For instance, the above-mentioned indicator is implemented as a graphic image of a guide box guiding a specific area desired to enlarge or an enlarged specific area. This will be described in more detail with reference to FIG. 19.

The controller 1530 changes a coordinate information of a pointer moving in accordance with a motion of the external device depending on the video data of the received broadcast signal. For instance, if a resolution information of the video data of the received broadcast signal corresponds to HD (high definition), the coordinate information of the pointer is designed to be scaled by 0.66 times. If the resolution information of the video data of the received broadcast signal corresponds to FHD (full high definition), the coordinate information of the pointer is designed to be scaled by 1 times. If the resolution information of the video data of the received broadcast signal corresponds to UHD (ultra high definition), the coordinate information of the pointer is designed to be scaled by 2 times. This will be described in more detail with reference to FIG. 27.

After the specific area enlargement mode has been executed, if an enlargement or reduction magnification of the video data displayed on the first area is changed in accordance with the at least one command received from the external device, the controller 1530 automatically changes a size of the indicator in the second area. This will be described in more detail with reference to FIG. 31.

After the specific area enlargement mode has been executed, if the specific area desired to enlarge is recognized within the first area in accordance with the at least one command received from the external device, the controller 1530 automatically changes a center point of the indicator within the second area. This will be described in more detail with reference to FIG. 32. In addition, the controller 1530 controls both of the video data within the second area and the indicator within the second area to be removed after the elapse of a preset time after executing the specific area enlargement mode or in accordance with the at least one command received from the external device. This will be described in more detail with reference to FIG. 33.

Moreover, after both of the video data within the second area and the indicator within the second area have been removed, the controller 1530 displays a graphic image for guiding that the specific area enlargement mode is being executed. Further, the graphic image includes an information indicating the enlargement magnification. The controller 1530 is designed to display both of the video data within the second area and the indicator within the second area again in accordance with a command for selecting the graphic image. This will be described in more detail with reference to FIG. 34.

For instance, the location or size of the indicator is changed based on an information obtained from a touch sensor or a motion sensor of the external device. For example, the external device can be designed by referring to FIGS. 6, 13 and 14 mentioned in the foregoing description. In more particular, for instance, the external device corresponds to a remote controller or a mobile device, which includes at least one of an RF (radio frequency) module and an IR (infrared) module. For instance, the aforementioned first area corresponds to a full screen of the television and the second area corresponds to a partial area included in the first area. In this regard, more details will be further described with reference to FIG. 19.

Figure 16:
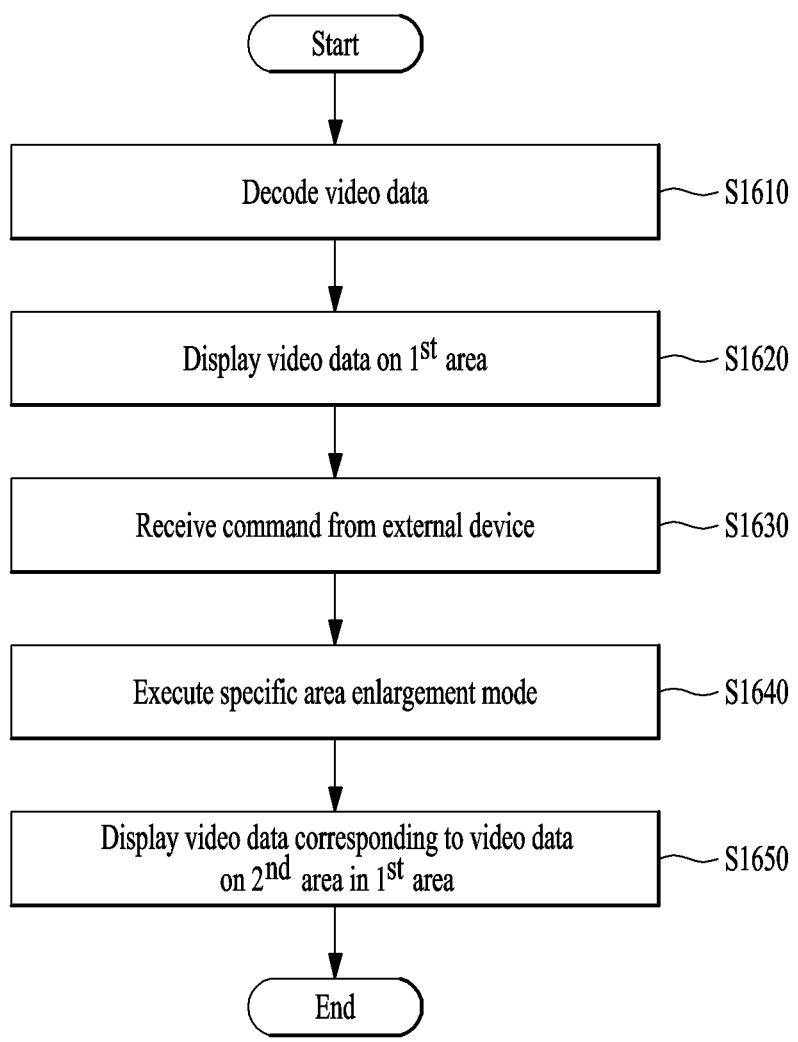
FIG. 16 is a flowchart of a method for controlling a multimedia device according to one embodiment of the present invention.

Next, FIG. 16 is a flowchart of a method for controlling a multimedia device according to one embodiment of the present invention. Referring to FIG. 16, a multimedia device according to one embodiment of the present invention performs decoding on video data received externally or stored in a memory (S1610), displays the decoded video data on a first area (S1620), and then receives at least one command from an external device (S1630). For instance, the multimedia device corresponds to one of a television, an STB and the like.

Moreover, the multimedia device executes a specific area enlargement mode in accordance with the at least one commands received from the external device (S1640) and displays video data corresponding to the video data on a second area within the first area as well (S1650). And, the second area includes an indicator and the video data displayed on the first area is changed depending on at least one of a location of the indicator and a size of the indicator. In this regard, more details will be further described with reference to FIG. 19.

Figure 17:
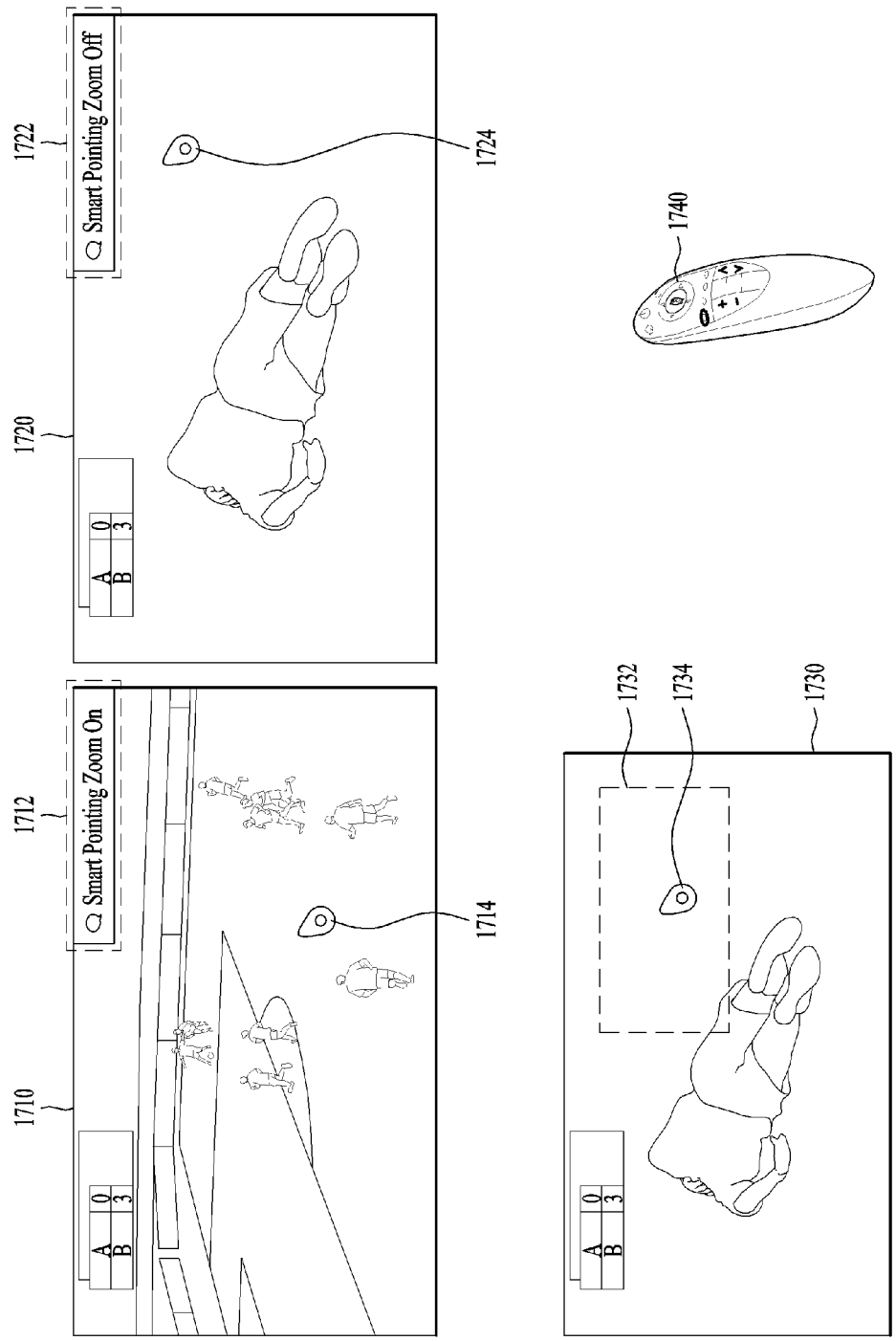
FIG. 17 is a diagram illustrating a case of activating a specific area enlargement mode according to one embodiment of the present invention.

FIG. 17 is a diagram illustrating activating a specific area enlargement mode according to one embodiment of the present invention. Referring to the upper left drawing 1710 in FIG. 17, when the controller 1530 receives a command for activating a specific area enlargement mode from an external remote controller 1740 through the communication module 1520, the controller 1530 displays at least one of a notification message 1712 indicating that the specific area enlargement mode is activated and a pointer 1714 capable of selecting a specific point desired to enlarge within a first area.

If the controller 1530 receives a command for specifying the specific point desired to enlarge within the first area from the external remote controller 1740 through the communication module 1520, the controller 1530 specifies an area including the specific point using the pointer in response to the command, enlarges the specified area including the specific point, and then displays the enlarged specified area including the specific point.

Referring to the upper right drawing 1720 in FIG. 17, when the controller 1530 receives a command for deactivating the specific area enlargement mode from the external remote controller 1740 through the communication module 1520, the controller 1530 displays a notification message 1722 indicating that the specific area enlargement mode is deactivated. A pointer 1724 capable of selecting a specific point is designed to be removed within a first area.

Referring to the lower left drawing 1730 in FIG. 17, the controller 1530 receives a command for selecting a specific part of first area using a pointer 1734 from the external remote controller 1740 through the communication module 1520 and then displays a specific area 1732 to be enlarged in response to the received command in advance. Therefore, it is advantageous in that the user can check an area to be enlarged in advance.

Figure 18:
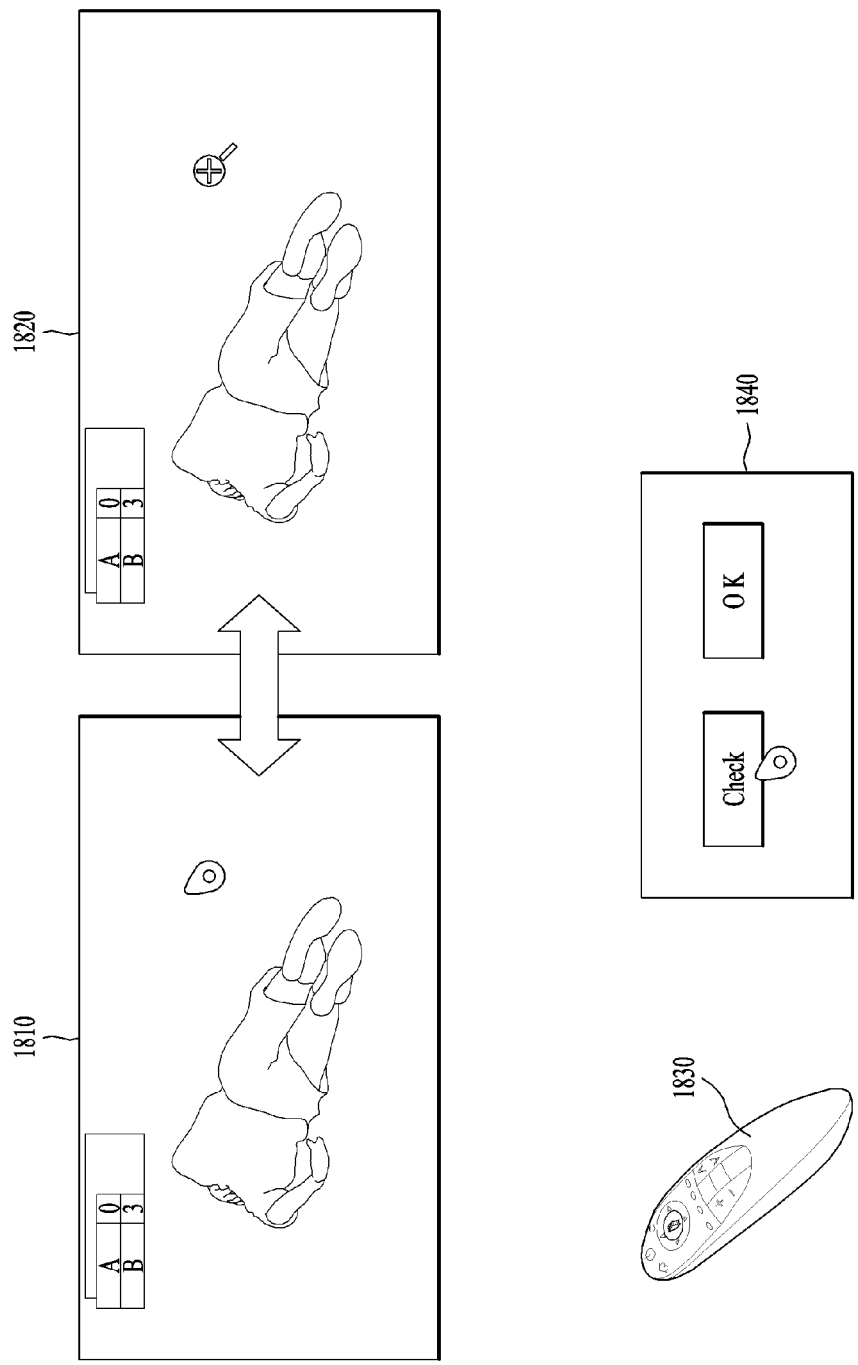
FIG. 18 is a diagram illustrating a changed shape of a pointer in case of activating a specific area enlargement mode according to one embodiment of the present invention.

Next, FIG. 18 is a diagram illustrating a changed shape of a pointer when activating a specific area enlargement mode according to one embodiment of the present invention. Referring to FIG. 18, if a specific area enlargement mode 1840 is activated by receiving a command from an external remote controller 1830, the controller 1530 changes a pointer shape from an original shape (first graphic image) into a different shape (second graphic image).

For instance, if an enlargement rate increases in the specific area enlargement mode, the controller 1530 changes a pointer shape from an original shape 1810 to a shape '+' 1820. Also, if the enlargement rate decreases in the specific area enlargement mode, the controller 1530 changes the pointer shape from the original mode to shape '−'. Therefore, according to one embodiment of the present invention, if the specific area enlargement mode is activated, the pointer shape is changed into a magnifying glass shape and varies depending on an increase and decrease in the enlargement rate. Therefore, the user convenience is improved since a user can intuitively know an entry of the specific area enlargement mode and an increasing state of the enlargement rate.

Figure 19:
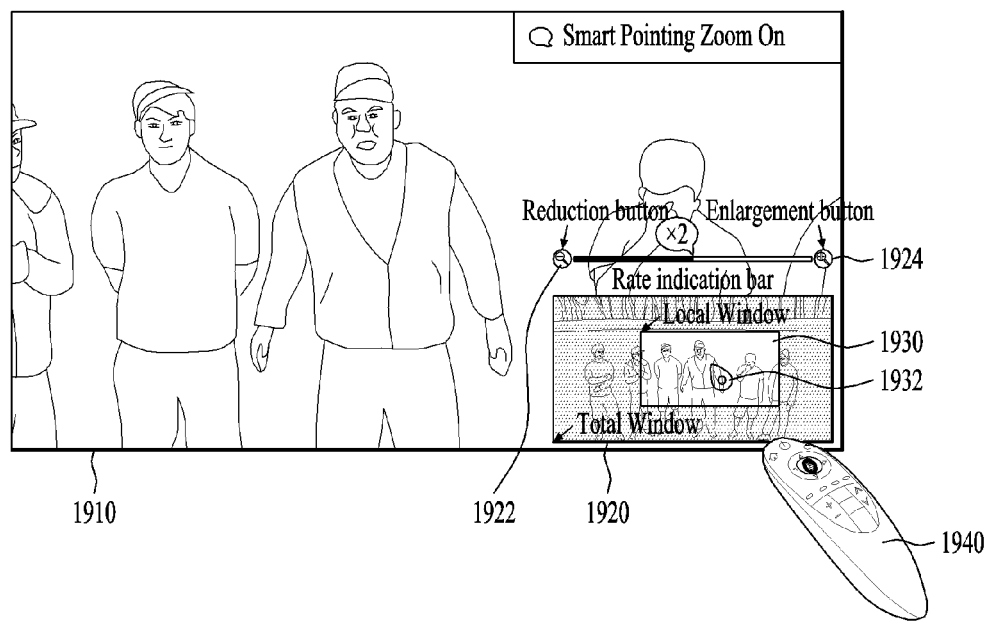
FIG. 19 is a diagram illustrating controlling a screen in case of activating a specific area enlargement mode according to one embodiment of the present invention.

FIG. 19 is a diagram illustrating controlling a screen when activating a specific area enlargement mode according to one embodiment of the present invention. For clarity, 'specific area enlargement mode' can be simply named 'enlargement mode'. First of all, a display device according to one embodiment of the present invention displays a content on a main screen 1910 and enters an enlargement mode in accordance with an enlargement input request received from a remote controller.

The display device displays a window 1920 including the content displayed on the main screen 1910 and displays an indicator 1930 for selecting a specific area of the displayed content within the displayed window 1920. The display device enlarges the selected specific area of the displayed content. Further, the display device is designed to display the enlarged selected specific area of the displayed content on the main screen 1910. The above-mentioned content corresponds to a video.

For clarity of the following description, the main screen 1910 can be named a first region and the window 1920 can be named a second region. There are no limitations put on the form and size of the window 1920. In more particular, for example, while outputting video data included in a broadcast signal, the display device receives an input signal (e.g., 'OK' button) from a remote controller 1940 over a preset time, the display device displays the video data even on the window 1920. When the specific area enlargement mode is initially executed, the same video data is displayed on each of the main screen 1910 and the window 1920. In particular, the video data displayed on the main screen 1910 is identical to the video data displayed on the window 1920 but they are different in a size only.

Moreover, an indicator 1930 is displayed within the window 1920. Also, the indicator 1930 is used for a user to select a specific area desired to enlarge. For instance, the indicator 1930 can be implemented as a graphic image of a guide box guiding a specific area desired to enlarge or an enlarged specific area. Moreover, it is apparent that the adoption of other graphic images comes within the scope of the appended claims and their equivalents.

Furthermore, the window 1920 may be named a total window and the indicator 1930 may be named a local window. A specified area is enlarged through the indicator 1930 and then output on the main screen 1910. In other words, when the display device newly enters the specific area enlargement mode, the display device outputs original video data through the main screen 1910. In selecting the specific area desired to enlarge using the window 1920 and the indicator 1930, the display device replaces the original video data with the video data resulting from enlarging the specific area only and displays the video data resulting from enlarging the specific area only instead of the original video data. In addition, for example, it is designed to change a location of the indicator 1930 depending on a location change of a pointer 1932. Also, for example, if the specific area desired to enlarge is determined after executing the specific area enlargement mode, the original video data is displayed on the window 1920 by being scaled by 1 times. This means that the size of the original video data is reduced only. Moreover, the video data resulting from enlarging (greater than 1 times, e.g., 1.2 times, 1.5 times or 2.0 times) the specific area only is displayed on the main screen 1910 instead of the original video data.

For instance, the controller 1530 is designed for a user to easily check the specific area desired to enlarge by adjusting brightness of an inside area of the indicator 1930 in the window 1920 to be high and brightness of an outside area of the indicator 1930 to be low. Moreover, a rate indication bar including both an enlargement button 1924 and a reduction button 1922 for changing a screen enlargement rate exists on the main screen 1910. If the controller 1530 receives a command for selecting one of the reduction button 1922 and the enlargement button 1924 using the pointer 1932, the controller 1530 adjusts a size of the indicator 1930 to a preset rate in response to the command. The controller 1530 changes a shape of the pointer 1932 depending on the command for selecting the one of the reduction button 1922 and the enlargement button 1924. The rate indication/control bar including both of the reduction button 1922 and the enlargement button 1924 is named a second indicator and may be discriminated from indicator 1930 mentioned in the foregoing description.

In this instance, a minimum value of magnification in accordance with the selection of the reduction button 1922 can become 1 times and a maximum value of magnification in accordance with the selection of the enlargement button 1924 can become 5 times. In this instance, the maximum value of the enlargement magnification is not limited by 5 times but can be adjustable. When the enlargement magnification is smaller than 1 times, an image displayed on the screen is reduced.

For instance, if the controller 1530 receives a command for selecting the reduction button 1922, the controller changes the pointer shape from an original shape of the pointer 1932 into shape '−'. And, if the controller 1530 receives a command for selecting the enlargement button 1924, the controller 1530 changes the pointer shape from the original shape of the pointer 1932 into shape '+'.

Moreover, the window 1920 can be implemented as a PIP (picture in picture) screen. And, a size of the PIP screen is designed to be adjustable. For instance, if the controller 1530 receives a command for clicking on an edge portion (i.e., corner portion) of the PIP screen and moving it from a first point to a second point different from the first point while continuously maintaining a state of clicking from an external device (e.g., remote controller), the controller 1530 can adjust the size of the PIP screen.

Furthermore, the controller 1530 can change a location of the PIP screen. For instance, if the controller 1530 receives a command for clicking on the first point of the PIP screen by the pointer and moving it from the first point to the second point within a first area different from the first point while continuously maintaining the state of clicking from the external remote controller, the controller 1530 can change the location of the PIP screen. In this instance, the above-mentioned PIP screen corresponds to the window 1920 as shown in FIG. 19.

For example, the window 1920 is continuously present, it may be inconvenient for a user to watch video data playback. Therefore, after a preset time (e.g., 3 seconds) has elapsed, the controller 1530 changes states of the widow 1920 and the indicator 1930 into hidden states. In addition, if the controller 1530 receives a preset command from an external device 1940, the controller 1530 displays the window 1920 and the indicator 1930 on the PIP screen again.

If the pointer 1932 is located at one of a right boundary line, a left boundary line, an upper boundary line, and a lower boundary line of the second area 1920, the controller 1530 changes the states of the widow 1920 and the indicator 1930 into the hidden states. Also, if a specific command is received from the external device 1940, the controller 1530 displays the window 1920 as the PIP screen within the main screen 1910 again.

The controller 1530 moves the indicator 1930 using the pointer 1932. In addition, the video data displayed on the main screen 1910 is changed in accordance with a change of a location of the indicator 1930 by being interconnected with the change of the location of the indicator 1930. For instance, the video data in the area specified by the indicator 1930 and the enlarged video data displayed on the main screen 1910 are identical to each other but differ in a size only (i.e., it is apparent by comparing the main screen 1910 with the indicator 1930 shown in FIG. 19). In more particular, for example, if the indicator 1930 in the window 1920 includes a specific object only, the main screen 1910 also displays video data including the specific object only. However, compared with video data within the indicator 1930, it is different in that a size of the video data within the main screen 1910 is enlarged only.

Therefore, by displaying the changed location and size of the indicator 1930 in real time, it has a technical effect capable of checking the enlarged specific area of the original video data more rapidly. In other words, if the specific area enlargement mode is executed, the original data is displayed on both of the main screen 1910 and the window 1920. The video data resulting from reducing the size only is displayed on the window 1920. In order to enlarge the specific area, the pointer 1932 can be located within the main screen 1910 or within the window 1920. The specific area desired to enlarge is confirmed by the pointer 1932 as a center point.

However, if the specific area desired to enlarge is confirmed, video data resulting from enlarging the specific area is displayed on the main screen 1910 instead of the original video data. Moreover, due to adjustment of an enlargement rate and the like, it is possible to design that enlarged video data displayed on the main screen 1910 is returned to the original video data. After having displayed the original video data on the main screen 1910 again, it can newly designate a specific area desired to enlarge by selecting a random point within the main screen 1910. Designation of a specific area desired to enlarge using the indicator 1930 within the window 1920 newly comes within the scope of the appended claims and their equivalents.

Furthermore, while the video data resulting from enlarging the specific area is displayed on the main screen 1910, if enlargement/reduction magnification is adjusted using the external device 1940 or the like, the display device is designed to automatically change the size of the indicator 1930 within the window 1920. Therefore, a user has an advantage capable of checking which part of the window 1920 corresponds to video data enlarged or reduced on the main screen 1910 in real time.

The second indicator 1922/1924 shown in FIG. 19 is used for setting an enlargement level. And, a content displayed on the main screen 1910 is received through a tuner or an external device. For instance, the external device corresponds to at least one of an STB, a PC and a cellular phone. The size of the indicator 1930 is automatically changed depending on the enlargement level selected through the second indicator 1922/1924.

Furthermore, another embodiment including receiving a first enlargement level for enlarging the displayed content, displaying the enlargement indicator having a first display size based on the received first enlargement level, receiving a second enlargement level for enlarging the displayed content, and displaying the enlargement indicator having a second display size different from the first display size based on the received second enlargement level can be implemented with reference to FIG. 19 mentioned in the foregoing description.

For instance, the window 1920 includes a PIP (picture in picture) window. The movement of the window 1920 within the main screen 1910 also comes within the scope of the appended claims and their equivalents. In addition, in order to select another specific area of a content displayed on the window 1920, the movement of the indicator 1930 within the window 1920 comes within the scope of the appended claims and their equivalents as well.

The indicator 1930 moves in accordance with a pointer signal received from the remote controller 1940. Also, the size of the indicator 1930 is changed in accordance with a wheel signal received from the remote controller 1940. The size of the indicator 1930 is increased in accordance with a reduced enlargement level 1922. On the contrary, the size of the indicator 1930 is reduced in accordance with an increased enlargement level 1924. For instance, the indicator 1930 is implemented as a graphic image of a guide box guiding a specific area desired to enlarge or an enlarged specific area.

Another feature of the present invention further includes changing a coordinate information of the pointer moving in accordance with a motion of the remote controller depending on the video data of the content displayed on the main screen 1910 shown in FIG. 19. For instance, if a resolution information of the video data of the content corresponds to HD (high definition), the scaling the coordinate information of the pointer by 0.66 times is further included. If the resolution information of the video data of the content corresponds to FHD (full high definition), the scaling the coordinate information of the pointer by 1 times is further included. Also, if the resolution information of the video data of the content corresponds to UHD (ultra high definition), the scaling the coordinate information of the pointer by 2 times is further included. In this regard, more details will be further described with reference to FIG. 27.

Both of the window 1920 and the indicator 1930 are controlled to be removed after the elapse of a preset time after executing the enlargement mode or in accordance with at least one command received from the remote controller 1940. After both of the window 1920 and the indicator 1930 has been removed, a graphic image for guiding that the enlargement mode is being executed is displayed. Also, the graphic image includes an information indicating enlargement magnification. In accordance with a command for selecting the graphic image, both of the window 1920 and the indicator 1930 are displayed again. In this regard, more details will be further described with reference to FIGS. 31 to 34.

Figure 20:
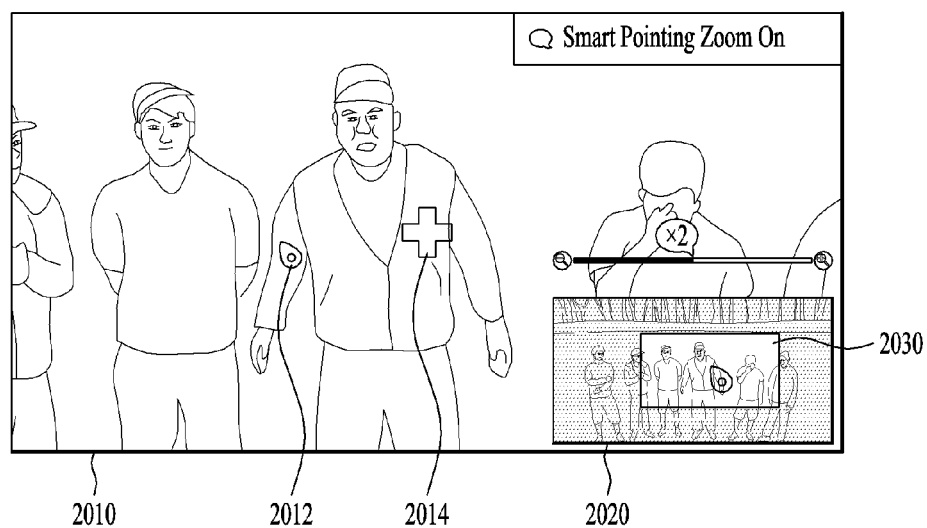
FIG. 20 is a diagram illustrating moving a specific point of an enlarged screen by a pointer in case of activating a specific area enlargement mode according to one embodiment of the present invention.

Next, FIG. 20 is a diagram illustrating moving a specific point of an enlarged screen by a pointer when activating a specific area enlargement mode according to one embodiment of the present invention. Referring to FIG. 20, in a situation that the controller 1530 displays an area specified by an indicator 2030 as a full screen on a first area 2010, if the controller 1530 receives a command for selecting a specific point 2012 of the full screen using a pointer from an external device, the controller 1530 moves a center point of the area specified by the indicator 2030 from an existing center point to the specific point 2012. Subsequently, the controller 1530 generates a new enlargement area centering on the specific area 2012 and displays the generated new enlargement area as the full screen.

Furthermore, according to another embodiment of the present invention, it can select a center point of a specific area desired to enlarge in a second area 2020 or select a center point of a specific area desired to enlarge in a first area 2010. When the center point of the specific area desired to enlarge is selected using the first area 2010, it has an advantage of adjusting the enlargement area minutely. And, when the center point of the specific area desired to enlarge is selected using the second area 2020, it has an advantage of changing the specific area while checking original video data in general.

Next, FIG. 21 is a diagram of controlling a screen using a remote controller when activating a specific area enlargement mode according to one embodiment of the present invention. As mentioned in the foregoing description, a multimedia device (e.g., TV or STB) according to one embodiment of the present invention is controlled by an external device. Also, the external device corresponds to a remote controller or a mobile device. Although FIG. 21 shows a remote controller as an example of an external device, the scope of the appended claims and their equivalents is not limited by the remote controller only.

According to one embodiment of the present invention, an external remote controller 2140 includes a wheel key 2142, a direction key 2144 and a volume key 2146. If the controller 1530 receives a specific command corresponding to an operation of the wheel key 2142 from the external remote controller 2140, the controller 1530 adjusts a screen enlargement rate in accordance with the operation of the wheel key 2142.

For instance, if the controller 1530 receives a specific command corresponding to an input for rotating a wheel toward an upper direction of the wheel key 2142 from the external remote controller 2140, the controller 1530 increases the screen enlargement rate. And, if the controller 1530 receives a specific command corresponding to an input for rotating the wheel toward a lower direction of the wheel key 2142 from the external remote controller 2140, the controller 1530 decreases the screen enlargement rate.

A user can change a screen enlargement magnification in the range of 1 to 5 times through the wheel key of the remote controller. Whenever the wheel key is moved by 1 unit, the screen enlargement magnification is changed by 0.2 times.

The screen enlargement magnification is not fixed but designed to be capable of being modified through a user configuration.

If the controller 1530 receives a specific command corresponding to an operation of the volume key 2146 from the external remote controller 2140, the controller 1530 adjusts the screen enlargement rate in accordance with the operation of the volume key 2146. For example, if the controller 1530 receives a specific command corresponding to part '+' of the volume key 2146 from the external remote controller 2140, the controller 1530 increases the screen enlargement rate. In addition, if the controller 1530 receives a specific command corresponding to part '−' of the volume key 2146 from the external remote controller 2140, the controller 1530 decreases the screen enlargement rate.

If the controller 1530 receives a specific command corresponding to an operation of the direction key 2144 from the external remote controller 2140, the controller 1530 moves a center point of an area specified by an indicator 2130 from an existing center point to a specific point in accordance with the operation of the direction key 2144, generates enlarged video data centering on the specific point, and then displays the generated enlarged video data on a first area 2110.

If an enlargement rate and a location of a specific area are changed using keys of the external remote controller, a location and a size of the indicator 2130 within a second area 2120 corresponding to PIP screen are also changed by being interconnected with the enlargement rate and the location of the specific area. According to another embodiment of the present invention, an external remote controller 2150 includes a volume key 2156, a channel key 2152 and a touch pad 2154. The external remote controller 2150 is controlled by a motion sensor or a voice recognition sensor.

If the controller 1530 receives a specific command corresponding to an operation of the volume key 2156 from the external remote controller 2150, the controller 1530 adjusts the screen enlargement rate in accordance with the operation of the volume key 2156. For instance, if the controller 1530 receives a specific command corresponding to an up direction part of the volume key 2156 from the external remote controller 2150, the controller 1530 increases the screen enlargement rate. Also, the controller 1530 receives a specific command corresponding to a down direction part of the volume key 2156 from the external remote controller 2150, the controller 1530 decreases the screen enlargement rate.

If the controller 1530 receives a specific command corresponding to an operation of a channel key 2152, the controller 1530 adjusts the screen enlargement rate in accordance with the operation of the channel key 2152. For example, if the controller 1530 receives a specific command corresponding to an up direction part of the channel key 2152 from the external remote controller 2150, the controller 1530 increases the screen enlargement rate. In addition, if the controller 1530 receives a specific command corresponding to a down direction part of the channel key 2152 from the external remote controller 2150, the controller 1530 decreases the screen enlargement rate.

If the controller 1530 receives a specific command corresponding to an operation of the touch pad 2154 from the external remote controller 2140, the controller 1530 moves a center point of an area specified by the indicator 2130 from an existing center point to a specific point in accordance with the operation of the touch pad 2154, generates enlarged video data centering on the specific point, and then displays the generated enlarged video data on the first area 2110.

Figure 22:
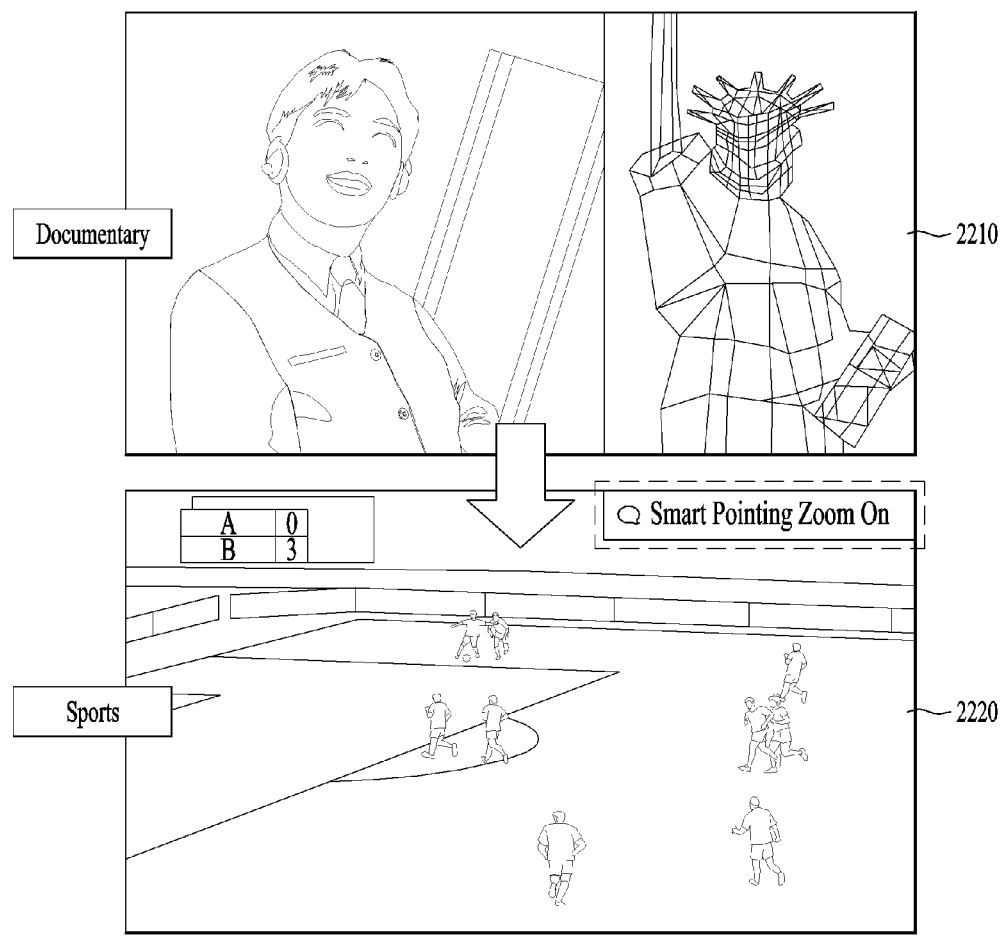
FIG. 22 is a diagram of automatically executing a specific area enlargement mode in association with an EPG information according to one embodiment of the present invention.

FIG. 22 is a diagram of automatically executing a specific area enlargement mode in association with an EPG information according to one embodiment of the present invention. Referring to FIG. 22, the EPG signal processing module 1560 extracts a category information (e.g., genre information, etc.) from a broadcast signal containing an EPG signal and then analyzes the extracted category. In this instance, for example, the category corresponds to one of sports, news, documentary, movie, drama, entertainment, art, talk show and the like.

If the information included in the broadcast signal corresponds to a specific category, the controller 1530 executes the specific area enlargement mode automatically. For instance, if a currently outputting broadcast program (i.e., video data) corresponds to such a category as sports, news or the like, the controller 1530 activates the specific area enlargement mode automatically.

Moreover, if a currently outputting broadcast program (i.e., video data) corresponds to one of adult video, violent video, adult action and X-rated content, the controller 1530 changes a state of the specific area enlargement mode into an off state. Therefore, according to one embodiment of the present invention, it has an advantage of minimizing a time required for entering the specific area enlargement mode or reducing the misuse of the present invention by designing that the specific area enlargement mode is automatically turned on or off in accordance with the category information (e.g., genre information) of video data.

Figure 23:
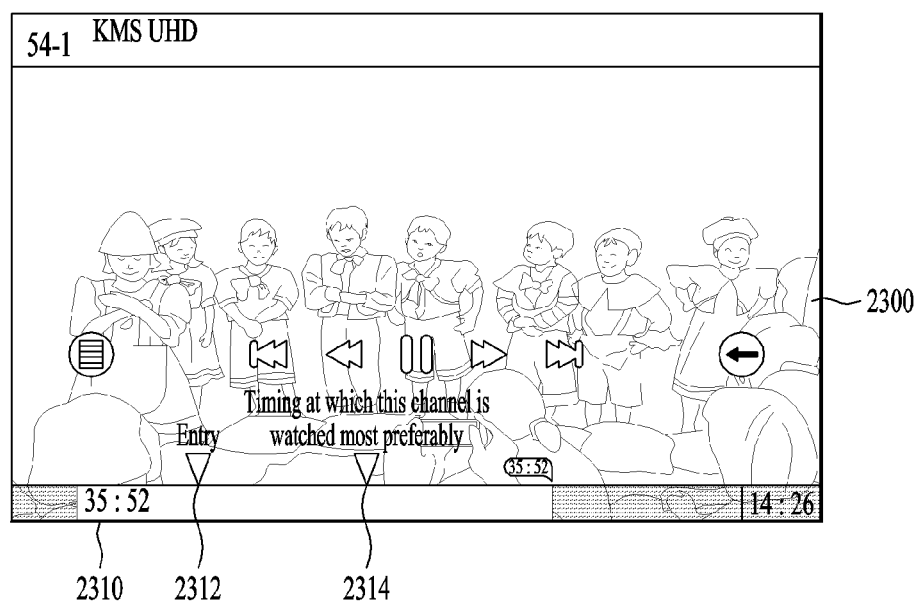
FIG. 23 is a diagram of executing a specific area enlargement mode in association with a time shift function according to one embodiment of the present invention.

FIG. 23 is a diagram of executing a specific area enlargement mode in association with a time shift function according to one embodiment of the present invention. In this instance, a time shift function means the function of enabling a user to watch a missing program while watching TV in real time. For instance, even if it fails in receiving an explicit save command from a user, the memory 1550 is designed to save a currently outputting broadcast program for a prescribed time automatically. In this instance, for example, the memory 1550 corresponds to a removable hard disk, an external USB memory, a memory built in a multimedia device or the like.

Referring to FIG. 23, the controller 1530 displays a bar 2310 indicating a playback timing on a bottom part of a first area 2300, on which video data is displayed. For instance, when a genre information of the video data corresponds to sports, the controller 1530 marks a timing 2312 at which a goal is scored and a timing 2314 at which the corresponding video data is watched most preferably. The specific timings 2312 and 2314 can be collected through an EPG information or web search. When the specific timings are selected, the specific area enlargement mode is designed to be automatically executed.

According to another embodiment of the present invention, the controller 1530 retrieves at least one video data saved in the memory 1550 and plays a section of the retrieved video data on which a specific area enlargement function is performed. For instance, in video data of a specific singer group consisting of 9 members including a first singer and a second singer, a user may be interested in only a section in which the first singer and the second singer sing. Unlike an existing time shift function, the controller 1530 saves an information on the section having the specific area enlargement function performed thereon together with the video data in the memory 1550.

The controller 1530 retrieves the section, on which the specific area enlargement function is performed, from the memory 1550 and plays the retrieved section only. Therefore, according to an embodiment of the present invention, since the section having the specific area enlargement function automatically performed thereon is retrieved and the retrieved section is played only, it has an advantageous in that a user does not need to play a whole section of video data.

According to another embodiment of the present invention, the controller 1530 performs partitioning a full screen on video data temporarily saved in the memory based on the number of specific area enlargement functions executed. It is designed that each of video data having the specific area enlargement function performed thereon (i.e., the video data resulting from enlarging only the specific area) is output through each of the partitioned screens. For example, regarding one video data (e.g., broadcast program), if the total number of the specific area enlargement functions executed is 9, the controller 1530 displays 9 partitioned screens. In each of the 9 partitioned screens, the controller 1530 displays each section on which the specific area enlargement function is performed. Hence, it has an advantage of checking the section having the specific area enlargement function performed thereon more rapidly.

Figure 24:
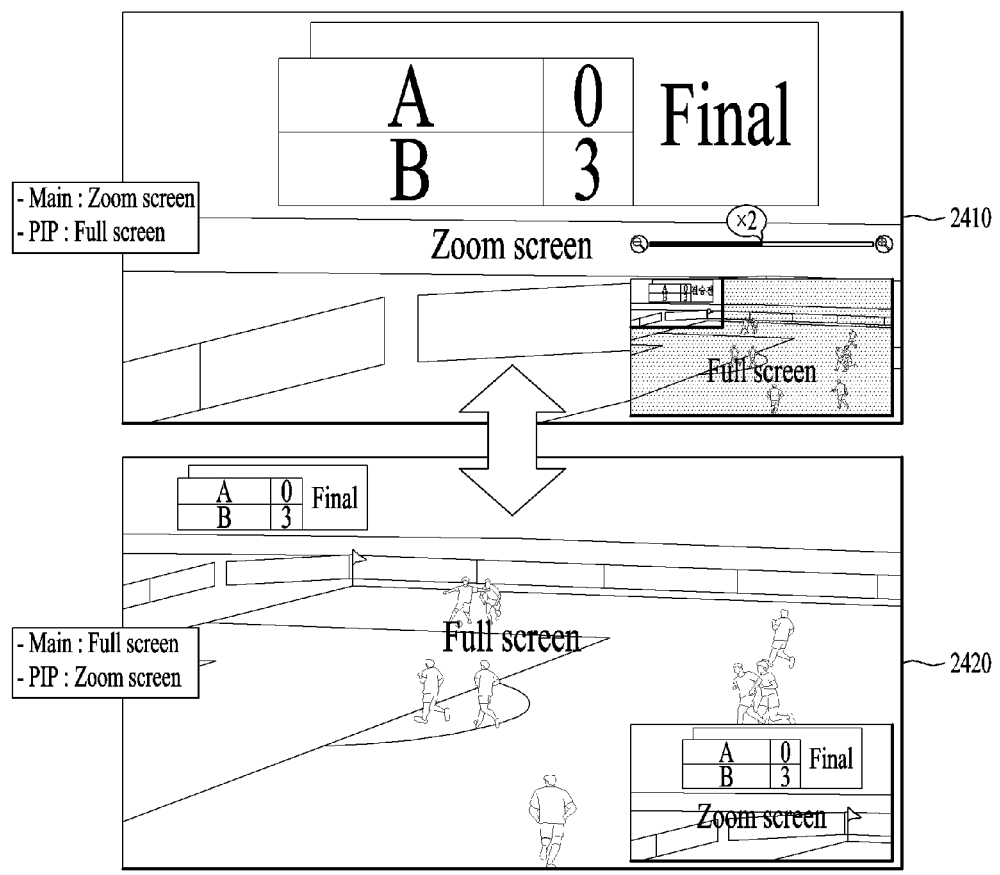
FIG. 24 is a diagram of switching between a full screen and a zoom screen according to one embodiment of the present invention.

FIG. 24 is a diagram of switching between a full screen and a zoom screen according to one embodiment of the present invention. Referring to FIG. 24, if the controller 1530 receives a specific command from an external remote controller, the controller 1530 switches a video signal to be transmitted to a first area and a video signal to be transmitted to a second area from each other and displays each of the first area and the second area.

In particular, the video signal to be transmitted to the first area corresponds to video data resulting from enlarging a specific area and the video signal to be transmitted to the second area corresponds to original video resulting from reducing its size only. Thus, as shown in the upper drawing 2410 of FIG. 24, the video data resulting from enlarging the specific area is displayed on a main screen and the original video data resulting from reducing the size only is displayed on PIP screen. In particular, both a full screen reduced by a prescribed rate and a location of the enlarged area of the full screen are displayed on the PIP screen.

As shown in the lower drawing 2420 of FIG. 24, the full screen is displayed on the main screen and a screen resulting from enlarging the specific area is displayed on the PIP screen. Therefore, according to one embodiment of the present invention, it has an advantage of displaying the original video data and the video data resulting from enlarging the specific area on the full screen or the PIP screen selectively by switching the original video data and the video data resulting from enlarging the specific area from each other rapidly.

Figure 25:
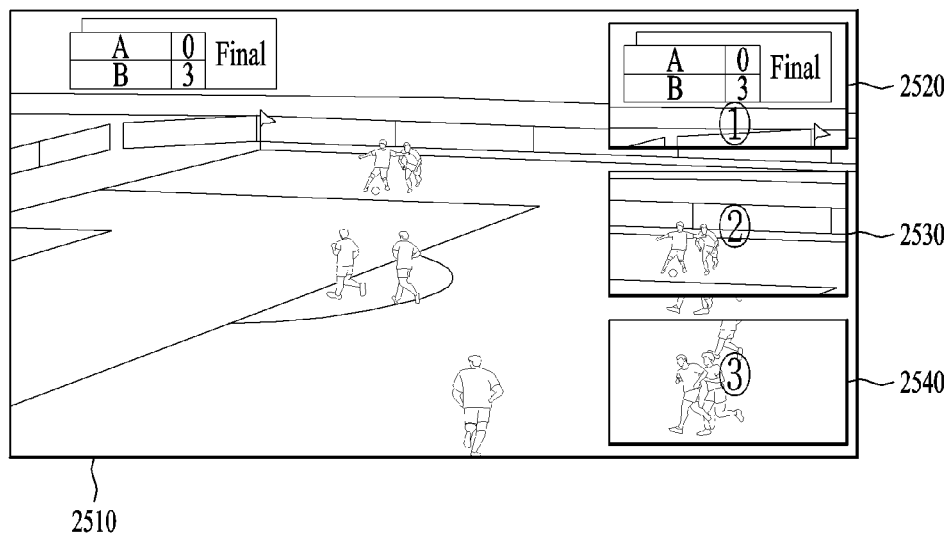
FIG. 25 is a diagram illustrating selecting and enlarging several points on a screen according to one embodiment of the present invention.

Next, FIG. 25 is a diagram illustrating selecting and enlarging several points on a screen according to one embodiment of the present invention. Referring to FIG. 25, in a situation that a specific area enlargement mode is activated, if the controller 1530 receives a command for specifying a plurality of points within the a first area 2510 from an external remote controller through a communication module in a prescribed time, the controller 1530 generates and displays PIP screens amounting to the number of the points automatically.

For instance, in a situation that the controller 1530 enters the specific area enlargement mode, if the controller 1530 receives a command for selecting 3 specific points within the first area 2510 from the external remote controller through the communication module in 3 seconds, the controller 1530 displays a first PIP screen 2520, a second PIP screen 2530 and a third PIP screen 2540. Each of the PIP screens includes video data enlarged centering on each of the 3 specific points.

According to one embodiment of the present invention, when a user desires to watch by enlarging several points within one screen, the user specify a plurality of points. And, each of the specified points can be displayed on a specific part of the screen as the PIP screen. In this instance, if several people are located at different positions of one screen respectively, several people are simultaneously specified and the specified several people are identified respectively. Therefore, since it can know detailed information on clothes, a watch and accessory of an identified person can be known more precisely, the user convenience is improved.

Figure 26:
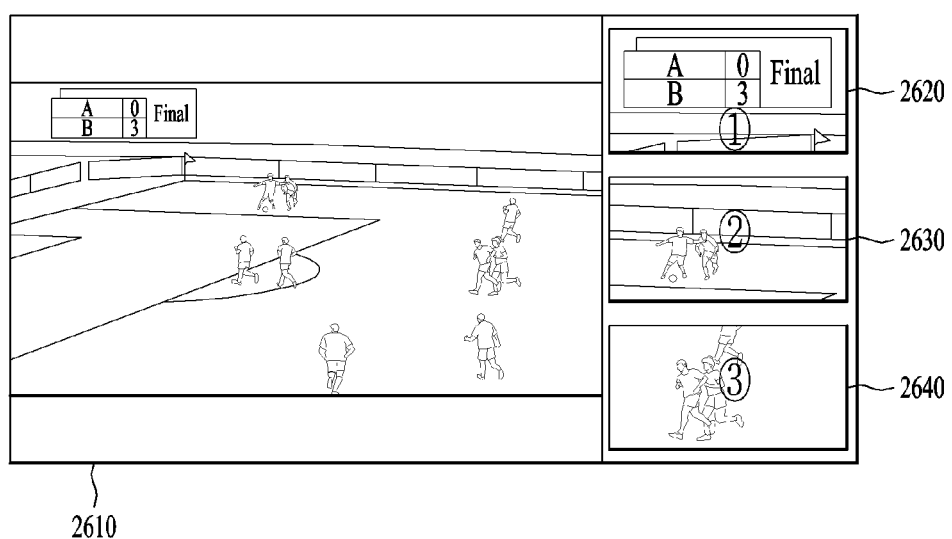
FIG. 26 is a diagram illustrating selecting and enlarging several points on a screen according to one embodiment of the present invention.

FIG. 26 is a diagram illustrating selecting and enlarging several points on a screen according to one embodiment of the present invention. Since an embodiment shown in FIG. 26 is similar with the embodiment shown in FIG. 25, the difference between the two embodiments is mainly described. However, FIG. 26 may be interpreted with reference to FIG. 25.

For instance, in a situation that the controller 1530 enters the specific area enlargement mode, if the controller 1530 receives a command for selecting 3 specific points from an external remote controller through a communication module in 3 seconds, the controller 1530 reduces a size of a first area 2610 having original video data displayed thereon by 80% and then displays a first subscreen 2620, a second subscreen 2630 and a third subscreen 2640 on an area except the first area 2610. Each of PIP screens includes video data enlarged centering on each of the 3 specific points.

Compared with FIG. 25, a solution for solving a problem that the original video data is covered with the PIP screens is provided in FIG. 26. In particular, the change of the size of the first area having the original vide data displayed thereon in accordance with the number of subscreens 2620, 2630 and 2640 corresponds to one feature of the present invention.

FIG. 27 is a diagram illustrating solving a case of coordinates of a remote controller not being identical to those of input video according to one embodiment of the present invention. In a process for implementing another embodiment of the present invention, a technical problem described with reference to FIG. 27 and in the following description are solved.

Referring to FIG. 27, coordinates of a remote controller are 1920×1080 in a two-dimensional plane 2710 whereas coordinates of a video signal may become 3840×2160 in a two-dimensional plane 2720. In this instance, the coordinates are not fixed but can be modified in accordance with a resolution of an input video signal or a device. Each value of the coordinates is not an absolute value but can be changed as a relative value. The resolution means how many pixels are included in one screen and is represented by multiplying the number of width pixels and the number of height pixels together. In particular, when a resolution is 1920×1080, the number of the width pixels is 1920 and the number of the height pixels is 1080. Further, it is represented as two-dimensional plane coordinates.

For instance, since the coordinates of the remote controller are not equal to those of the video signal, although a user selects a point P of x=1440 and y=270, the controller 1530 recognizes that a point P' of x=720 and y=135 is selected. Therefore, the difference is generated between the coordinates intended by the user and the coordinates recognized by the controller 1530.

In this instance, when an external remote controller transfers data to a display device, the external remote controller transfers data including a coordinate information of the corresponding remote controller. The external remote controller and the display device are connected with each other through wireless communication. Also, the wireless communication includes RF communication and IR communication. Moreover, the external remote controller may correspond to a smartphone or a mobile device including a tablet PC.

The controller 1530 performs scaling on the coordinate information of the external remote controller in accordance with a video signal information of a content. In particular, when the video signal information of the content is changed, the controller 1530 senses the changed video signal information and then performs scaling on received plane coordinates of the external remote controller based on the sensed video signal information.

For instance, when the coordinates of the remote controller are 1920×1080 and a video signal resolution information of the content is 720P HD corresponding to 1280×720, the controller 1530 changes the received coordinates of the remote controller into 1280×720 by scaling the received coordinates of the remote controller with reference to the video signal information. When the resolution corresponds to HD, a scaling factor becomes 0.66.

When the video signal resolution information of the content is FHD corresponding to 1920×1080, the controller 1530 performs scaling with reference to the video signal information. If the resolution is FHD, the coordinates of the remote controller and the coordinates of the video signal information are equal to each other, whereby the scaling factor becomes 1.

If the video signal resolution information of the content is UHD corresponding to 3840×2160, the controller 1530 changes the received coordinates of the remote controller to 3840×2160 by scaling the received coordinates of the remote controller with reference to the video signal information. When the resolution corresponds to UHD, the scaling factor becomes 2.

Next, FIG. 28 is a diagram illustrating solving a specific area desired to enlarge out of a video output range according to one embodiment of the present invention. Referring to an upper drawing 2810 of FIG. 28, when a specific area is enlarged using a point, at which a pointer is located, as a center point, a problem of generating an area not included in original vide data is caused.

Thus, referring to the lower drawing 2820 of FIG. 28, the specific area is enlarged by moving the center point to another point 2824 instead of the point 2822 at which the pointer is located. Compared to the upper drawing 2810 of FIG. 28, it is advantageous in that the enlargement is performed on an area included in the original video data only.

FIG. 29 is a diagram of an enlarged screen displayed by partitioning a screen into a prescribed number of partitioned screens while outputting video data, having a prescribed one of the partitioned screens selected by a user, and then enlarging the selected screen according to one embodiment of the present invention.

Referring to the upper drawing 2910 of FIG. 29, if the controller 1530 receives a specific command from an external remote controller, the controller 1530 partitions one screen into 9 screens during outputting video data. If a user selects a specific screen 2912 from the partitioned screens and the controller 1530 receives a command for selecting the specific screen 2912 from the external remote controller, the controller 1530 enlarges video data corresponding to the selected specific screen 2912 and then displays the enlarged video data.

Moreover, as shown in the lower drawing of FIG. 29, the controller 1530 reduces original video data by a prescribed rate and then displays the reduced original video data on a second area 2924. And, the controller 1530 enlarges the video data of the selected specific area as shown in the upper drawing 2910 of FIG. 29 and then displays the enlarged video data on a first area 2920. Moreover, as mentioned in the foregoing description, an indicator 2922 for guiding the enlarged specific area is displayed together on the second area 2924.

Figure 30:
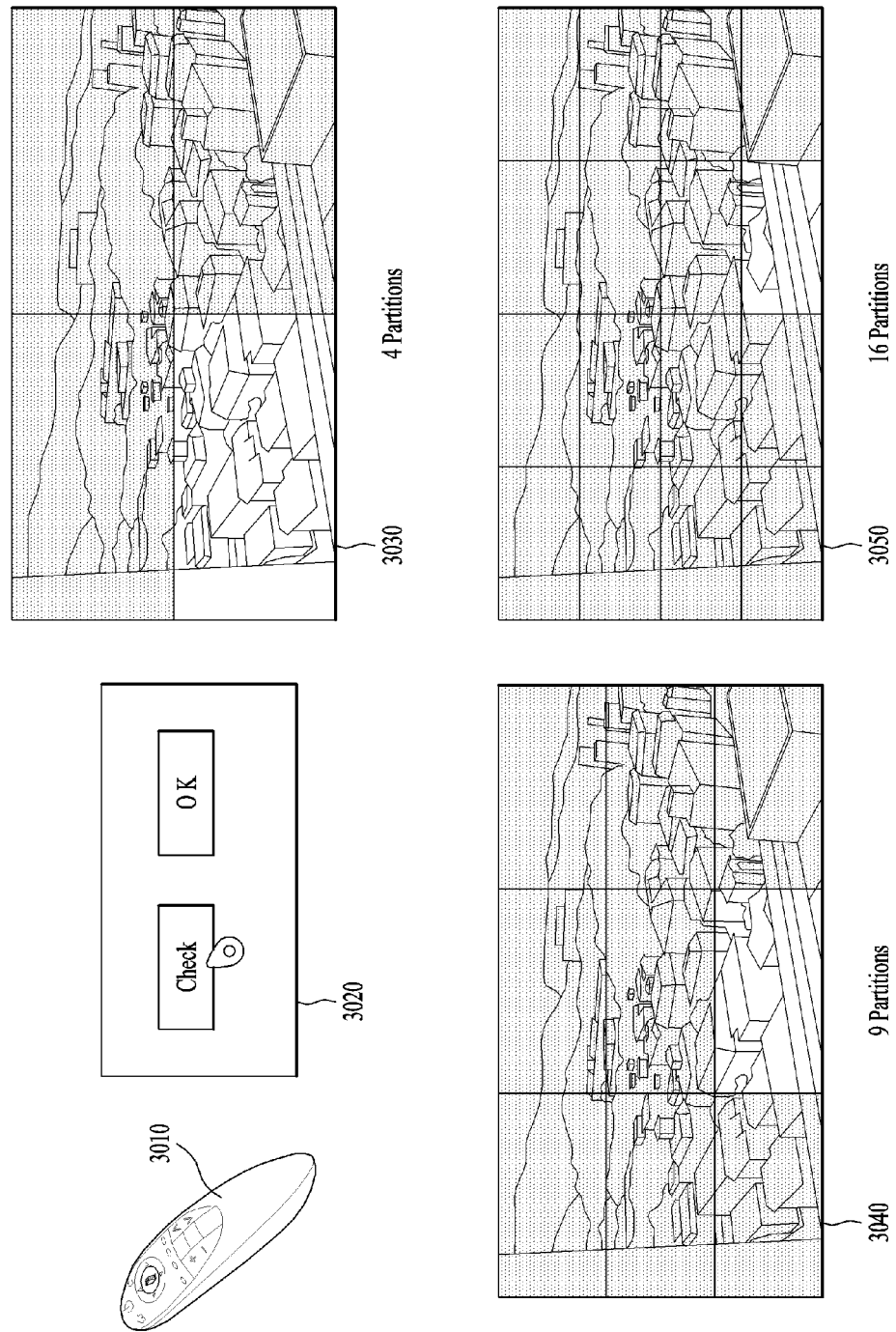
FIG. 30 is a diagram of an example for a controller to partition a screen into 4, 9 or 16 partitioned screens and to control the partitioned screens in accordance with user selection while outputting video data according to one embodiment of the present invention.

FIG. 30 is a diagram of an example for a controller to partition a screen into 4, 9 or 16 partitioned screens and to control the partitioned screens in accordance with user selection while outputting video data according to one embodiment of the present invention. Referring to FIG. 30, if the controller receives a specific command 3020 from an external remote controller 3010, the controller partitions a screen into 4 partitioned screens 3030 and then displays the 4 partitioned screens in outputting random video data. Alternatively, the controller 1530 partitions a screen into 9 partitioned screens 3040 and then displays the 9 partitioned screens in outputting random video data. The controller 1530 partitions a screen into 16 partitioned screens 3050 and then displays the 16 partitioned screens in outputting random video data. The number of the partitioned screens can be set to a preset default value or designed to be user-selectable. With reference to the partitioned screens, a user can select a specific area of video data desired to enlarge.

If an enlargement or reduction magnification of video data displayed on a first area is changed in accordance with at least one command received from an external device after a specific area enlargement mode has been executed, the controller 1530 automatically changes a size of an indicator in a second area. This will be described in more detail with reference to FIG. 31.

If the specific area desired to enlarge is recognized within the first area in accordance with the at least one command received from the external device after the specific area enlargement mode has been executed, the controller 1530 automatically changes a center point of the indicator within the second area. This will be described in more detail with reference to FIG. 32.

The controller 1530 controls both of the video data within the second area and the indicator within the second area to be removed after the elapse of a preset time after executing the specific area enlargement mode or in accordance with the at least one command received from the external device. This will be described in more detail with reference to FIG. 33.

Moreover, after both of the video data within the second area and the indicator within the second area have been removed, the controller 1530 displays a graphic image for guiding that the specific area enlargement mode is running. In addition, the graphic image includes an information indicating the enlargement magnification. Further, the controller 1530 is designed to display both of the video data within the second area and the indicator within the second area again in accordance with a command for selecting the graphic image. This will be described in more detail with reference to FIG. 34.

Next, FIG. 31 is a diagram of a process for adjusting an enlargement rate while executing a specific area enlargement mode according to one embodiment of the present invention. Implement of an embodiment partially different from the embodiment shown in FIG. 31 with reference to the drawings mentioned in the above description comes within the scope of the appended claims and their equivalents.

Referring to FIG. 31, when a specific area enlargement mode is executed and a specific area desired to enlarge is also specified, video data of an area specified by an indicator 3130 within a second area 3120 is displayed on a first area 3110 as well. As mentioned in the foregoing description, the video data in the indicator 3130 corresponds to the video data in the first area 3110. Also, they are identical to each other but differ in a size.

Moreover, regarding the video data displayed on the first area 3110, an enlargement or reduction command can be additionally transmitted to a multimedia device (e.g., TV or STB) using an external device 3100. For instance, a command for enlarging the video data within the first area 3110 is generated through a specific button of the external device 3100 as shown in FIG. 31 and the corresponding command is transmitted to the multimedia device.

Thus, as shown in FIG. 31, compared to the previous video data in the first area 3110, more enlarged video data is displayed on the first area 3111. Moreover, one feature of the present invention includes that at least one of a size and location of the indicator 3131 within the second area 3121 is automatically changed in order to respond to the video data within the first area 3111.

FIG. 32 is a diagram of a process for selecting an enlargement area while executing a specific area enlargement mode according to one embodiment of the present invention. Implementation of an embodiment partially different from the embodiment shown in FIG. 32 with reference to the drawings mentioned in the above description comes within the scope of the appended claims and their equivalents.

As mentioned in the foregoing description or referring to FIG. 32, video data in a first area 3210 and video data in a second area 3220 are identical to each other but differ in only a size at a timing at which a specific area enlargement mode is initially executed. Also, a location of an indicator 3230 in the second area 3220 is designed to correspond to a specific area last selected in previously executed specific area enlargement mode or a random area.

Meanwhile, it is assumed that a specific area desired to enlarge is selected using an external device 3200 on the premise of the above situation. Therefore, as shown in FIG. 32, video data resulting from enlarging the specific area is displayed on a first area 3211 and original video data is consistently displayed on a second area 3221 like a previous second area 3220. However, at least one of a location and size of an indicator 3231 with the second area 3221 is automatically changed. As shown in FIG. 32, the location or size of the indicator 3231 is automatically changed in order to respond to the video data displayed on the first area 3211. In case of designing the above-mentioned way, it has advantage capable of rapidly and easily checking which specific area of the original video data is enlarged and watched.

Next, FIG. 33 is a diagram of a process for removing a related indicator while executing a specific area enlargement mode according to one embodiment of the present invention. Implementation of an embodiment partially different from the embodiment shown in FIG. 33 with reference to the drawings mentioned in the above description comes within the scope of the appended claims and their equivalents.

As mentioned in the foregoing description or referring to FIG. 33, after a specific area enlargement mode has been executed, original video data is output through a second area 3330 and video data resulting from enlarging a specific area only is displayed on a first area 3310. Moreover, a size and location of an indicator 3320 are changed by being interconnected with the first area 3310.

However, due to the video data and the indicator 3320 within the second area 3330, it causes a problem that a part of the enlarged video data is covered. To solve this problem, the video data resulting from enlarging the specific area is designed to be still displayed on the first area 3311 after the elapse of a preset time (e.g., 3 to 5 seconds) or in case of reception of a specific command by a multimedia device from an external device 3300. Also, compared to the previous second area 3320, the indicator and the original video data are designed not to be displayed on a second area 3321. Therefore, a technical effect of enabling a user to watch the video data resulting from enlarging the specific area in the first area 3311 only is expected.

FIG. 34 is a diagram of a process for displaying a removed related indicator again while executing a specific area enlargement mode according to one embodiment of the present invention. Implementation of an embodiment partially different from the embodiment shown in FIG. 34 with reference to the drawings mentioned in the above description comes within the scope of the appended claims and their equivalents. In particular, in FIG. 34, assume the case described with reference to FIG. 33.

Compared to the lower drawing of FIG. 33, FIG. 34 is equal to FIG. 33 in that video data resulting from enlarging a specific area is displayed on a first area 3410. However, FIG. 34 is different from FIG. 33 in that there is a second different indicator 3440 for guiding that a specific area enlargement mode is running. In particular, the second different indicator 3440 includes an information indicating how many times the video data displayed on the first area 3410 is enlarged in comparison with original video data. In this instance, if the second different indicator is selected using an external device 3400, the original video data is displayed on a second area 3430 again. And, it is returned to display an indicator 3420 corresponding to a first area 3411 again.

According to one embodiment of the present invention, if a command for activating a screen enlargement mode is received from an external remote controller, a notification message and a pointer are displayed on a screen. Subsequently, a partial area of the screen (i.e., a specific portion of a main screen) is specified by a guide box indicating a screen enlargement area and the area specified by the guide box is displayed as a full screen. In addition, a subscreen that the main screen is reduced by a prescribed rate can be displayed as PIP screen within the full screen. Therefore, a user can intuitively know which portion of an original screen is enlarged.

According to one embodiment of the present invention, the user convenience is improved since a user can enlarge a desired portion of the broadcasting image only and then watch the enlarged portion. According to one embodiment of the present invention, the user convenience is improved since a user can easily adjust a location or an enlargement magnification of an area of a screen desired to enlarge.

According to another embodiment of the present invention, if a screen enlargement mode is used, a pointer of a screen is changed. Therefore, since a user can easily recognize that the screen enlargement mode is executed, the user convenience is improved. According to another embodiment of the present invention, if a user clicks on a specific point within a main screen having an enlarged image displayed thereon, a user can move a center point of a screen enlargement area. Therefore, since a user can precisely adjust the screen enlargement area in a narrow area, the user convenience is improved.

According to another embodiment of the present invention, the user convenience is improved since a screen enlargement function is automatically performed in case of a specific genre such as sports or news. According to another embodiment of the present invention, when a user moves a playback timing to a timing at which the user desires to watch again in association with a time shift function, the user can watch a desired portion as an enlarged image. Hence, the user convenience is improved.

According to another embodiment of the present invention, when a screen enlargement function is performed, a main screen and a PIP screen are switched into each other in a specific case. And, a user can watch original video through an enlarged screen, thereby improving user convenience.

According to another embodiment of the present invention, when coordinates of a remote controller and coordinates of a video signal are not equal to each other, a problem of discordance between two coordinates can be solved by changing the coordinates of the remote controller with reference to the coordinates of the video signal. Therefore, the user convenience is improved. According to another embodiment of the present invention, if a guide line is out of a screen display area, a problem that the guide line is out of the screen display area can be solved by moving a center point of the guide line. Therefore, the user convenience is improved.

The image display device and method for operating the same according to the embodiments of the present invention may be implemented as other embodiments by combining the whole or some parts of the embodiments of the present invention selectively.

In addition, the image display device and method for operating the same according to the embodiments of the present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer-readable media are distributed over a plurality of computer systems connected to a network so that computer-readable codes can be are written thereto and executed therefrom.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a display device, the method comprising:
   displaying content on a main screen of the display device;
   entering an enlargement mode in accordance with an enlargement input request received from a remote controller;
   displaying an indicator and a window, wherein the window comprises an image corresponding to the content displayed on the main screen;
   displaying an enlarged screen of a specific area, wherein the specific area is selected by using the indicator;
   controlling the enlarged screen to be changed in accordance with a position of a pointer selected in response to information received from the remote controller; and
   processing coordinate information of the pointer, a position of the pointer being changed in accordance with the information received from the remote controller so as to correspond to video coordinate information of the content.

2. A method of controlling a display device, the method comprising:
   displaying content on a main screen of the display device;
   entering an enlargement mode in accordance with an enlargement input request received from a remote controller;
   displaying an indicator and a window, wherein the window comprises an image corresponding to the content displayed on the main screen;
   displaying an enlarged screen of a specific area, wherein the selected specific area is selected by using the indicator;
   controlling the enlarged screen to be changed in accordance with a position of a pointer selected in response to information received from the remote controller; and
   displaying a position of the indicator at a specific point when the selected position of the pointer is within a predetermined area.

3. The method of claim 1, further comprising displaying a second indicator for setting an enlargement level, wherein the content corresponds to a video.

4. The method of claim 1, wherein the content is received through a tuner.

5. The method of claim 1, wherein the content is received through an external device.

6. The method of claim 5, wherein the external device corresponds to at least one selected from among an STB, a PC, and a cellular phone.

7. The method of claim 1, further comprising changing a size of the indicator in accordance with a selected enlargement level.

8. The method of claim 7, further comprising:
   receiving a first enlargement level for enlarging the displayed content;
   displaying the indicator at a first display size based on the received first enlargement level;
   receiving a second enlargement level for enlarging the displayed content; and
   displaying the indicator at a second display size, which is different from the first display size, based on the received second enlargement level.

9. The method of claim 1, wherein the window comprises a PIP (picture in picture) window.

10. The method of claim 1, further comprising moving the window within the main screen.

11. The method of claim 10, further comprising moving the indicator within the window in order to select a different specific area of the content displayed on the window.

12. The method of claim 11, wherein the indicator moves in accordance with a pointer signal received from the remote controller.

13. The method of claim 10, further comprising changing a size of the indicator in accordance with a wheel signal received from the remote controller.

14. The method of claim 7, wherein the changing the size of the indicator comprises:
   increasing the size of the indicator in accordance with a decreased enlargement level; and decreasing the size of the indicator in accordance with an increased enlargement level.

15. The method of claim 1, wherein the indicator is implemented as a graphic image of a guide box guiding either the enlarged specific area or a specific area that is desired to be enlarged.

16. The method of claim 1, further comprising controlling both of the window and the indicator to disappear after a lapse of a predetermined amount of time since execution of the enlargement mode or in accordance with at least one command received from the remote controller.

17. The method of claim 16, further comprising displaying a graphic image indicating that the enlargement mode is active after both the window and the indicator have disappeared, wherein the graphic image comprises information indicating an enlargement magnification.

18. The method of claim 17, further comprising displaying the window and the indicator again in accordance with a command for selecting the graphic image.

19. The method of claim 1, further comprising automatically executing the enlargement mode in accordance with category information of the content.

20. A display device comprising:
a display configured to display content on a main screen of the display device;
an interface configured to receive an enlargement input request from a remote controller; and
a controller configured to control the display and the interface, wherein the controller is configured to:
enter an enlargement mode in accordance with an enlargement input request received from the remote controller;
display an indicator and a window, wherein the window comprises an image corresponding to the content displayed on the main screen;
displaying an enlarged screen of a specific area, wherein the specific area is selected by using the indicator;
control the enlarged screen to be changed in accordance with a position of a pointer selected in response to information received from the remote controller; and
process coordinate information of the pointer, a position of the pointer being changed in accordance with the information received from the remote controller so as to correspond to video coordinate information of the content.

21. A display device comprising:
a display configured to display content on a main screen of the display device;
an interface configured to receive an enlargement input request from a remote controller; and
a controller configured to control the display and the interface, wherein the controller is configured to:
enter an enlargement mode in accordance with an enlargement input request received from the remote controller;
display an indicator and a window, wherein the window comprises an image corresponding to the content displayed on the main screen;
displaying an enlarged screen of a specific area, wherein the specific area is selected by using the indicator;
control the enlarged screen to be changed in accordance with a position of a pointer selected in response to information received from the remote controller; and
display a position of the indicator at a specific point when the selected position of the pointer is within a predetermined area.

22. The display device of claim 20, wherein the controller is further configured to display a second indicator for setting an enlargement level, and the content corresponds to a video.

23. The display device of claim 20, wherein the content is received through a tuner.

24. The display device of claim 20, wherein the content is received through an external device.

25. The display device of claim 24, wherein the external device corresponds to at least one of an STB, a PC, and a cellular phone.

26. The display device of claim 20, wherein the controller is further configured to change a size of the indicator in accordance with a selected enlargement level.

27. The display device of claim 26, wherein the controller is further configured to:
receive a first enlargement level for enlarging the displayed content;
display the enlargement indicator at a first display size based on the received first enlargement level;
receive a second enlargement level for enlarging the displayed content; and
display the enlargement indicator at a second display size, which is different from the first display size, based on the received second enlargement level.

28. The display device of claim 20, wherein the window comprises a PIP (picture in picture) window.

29. The display device of claim 20, wherein the controller is further configured to move the window within the main screen.

30. The display device of claim 29, wherein the controller is further configured to move the indicator within the window in order to select a different specific area of the content displayed on the window.

31. The display device of claim 30, wherein the indicator moves in accordance with a pointer signal received from the remote controller.

32. The display device of claim 29, wherein a size of the indicator is changed in accordance with a wheel signal received from the remote controller.

33. The display device of claim 26, wherein the controller is further configured to:
increase the size of the indicator in accordance with a decreased enlargement level; and
decrease the size of the indicator in accordance with an increased enlargement level.

34. The display device of claim 20, wherein the indicator is implemented as a graphic image of a guide box guiding either the enlarged specific area or a specific area that is desired to be enlarged.

35. The display device of claim 20, wherein the controller is further configured to:
scale the coordinate information of the pointer by 0.66 times when resolution information of video data of the content corresponds to HD (high definition);
scale the coordinate information of the pointer by 1 time when the resolution information of the video data of the content corresponds to FHD (full high definition); and
scale the coordinate information of the pointer by 2 times when the resolution information of the video data of the content corresponds to UHD (ultra high definition).

36. The display device of claim 20, wherein the controller is further configured to control both the window and the indicator to disappear after a lapse of a predetermined amount of time since execution of the enlargement mode or in accordance with at least one command received from the remote controller.

37. The display device of claim 36, wherein the controller is further configured to display a graphic image indicating that the enlargement mode is active after both the window and the indicator have disappeared, and
wherein the graphic image comprises information indicating an enlargement magnification.

38. The display device of claim 37, wherein the controller is further configured to display the window and the indicator again in accordance with a command for selecting the graphic image.

39. The display device of claim 20, wherein the controller is further configured to automatically execute the enlargement mode in accordance with category information of the content.

40. A smart television, the smart television comprising:
a display configured to display a content in a full screen of the smart television;
an interface configured to receive an enlargement input request from a remote controller; and
a controller configured to control the display and the interface, wherein the controller is configured to:
enter an enlargement mode in accordance with the received enlargement input request from the remote controller;
control the display to display an indicator and a PIP (Picture In Picture) window while displaying the content in the full screen, wherein the PIP window comprises the content displayed in the full screen, further the indicator is located within the PIP window;
move a position of the indicator within the PIP window in response to the remote controller's first command received via the interface;
enlarge a specific area corresponding to the indicator's position; and
control the display to display the enlarged specific area in the full screen.

41. The smart television of claim 40, wherein the content displayed in the full screen is a same image as the content displayed in the PIP window before receiving the remote controller's first command.

42. The smart television of claim 41, wherein both of the indicator and the PIP window are not displayed after the elapse of a preset time or in case of reception of a specific command from the remote controller.

43. The smart television of claim 42, wherein the enlarged specific area in the full screen is unchanged even though the remote controller's second command for changing the position of the indicator is received, if the indicator is positioned within a predetermined area.

44. The smart television of claim 43, wherein both of the first and the second commands are generated based on at least one of a direction key of the remote controller.

* * * * *